(12) United States Patent
Kamenšek et al.

(10) Patent No.: US 10,685,767 B2
(45) Date of Patent: Jun. 16, 2020

(54) SURGE PROTECTIVE DEVICE MODULES AND SYSTEMS INCLUDING SAME

(71) Applicant: RAYCAP IP DEVELOPMENT LTD, Nicosia (CY)

(72) Inventors: Sebastjan Kamenšek, Škofja Loka (SI); Tadej Knez, Grosuplje (SI); Milenko Vukotic, Ljubljana (SI); Igor Juričev, Izola (SI); Thomas Tsovilis, Ljubljana (SI)

(73) Assignee: RAYCAP IP DEVELOPMENT LTD, Nicosia (CY)

( * ) Notice: Subject to any disclaimer, the term of this patent is extended or adjusted under 35 U.S.C. 154(b) by 391 days.

(21) Appl. No.: 15/704,453

(22) Filed: Sep. 14, 2017

(65) Prior Publication Data

US 2019/0080826 A1    Mar. 14, 2019

(51) Int. Cl.
| | | |
|---|---|---|
| *H01C 7/12* | (2006.01) | |
| *H02H 9/04* | (2006.01) | |
| *H01H 37/00* | (2006.01) | |
| *H01H 37/08* | (2006.01) | |
| *H01H 37/32* | (2006.01) | |
| *H01C 7/102* | (2006.01) | |
| *H01H 37/76* | (2006.01) | |
| *H01H 37/04* | (2006.01) | |
| *H01T 1/14* | (2006.01) | |

(Continued)

(52) U.S. Cl.
CPC .............. *H01C 7/12* (2013.01); *H01C 7/102* (2013.01); *H01C 7/126* (2013.01); *H01H 37/002* (2013.01); *H01H 37/08* (2013.01); *H01H 37/32* (2013.01); *H01H 37/761* (2013.01); *H02H 9/04* (2013.01); *H01H 37/04* (2013.01); *H01H 83/10* (2013.01); *H01H 2037/763* (2013.01); *H01H 2235/01* (2013.01); *H01T 1/14* (2013.01); *H01T 4/04* (2013.01)

(58) Field of Classification Search
CPC .......... H01C 7/12; H01C 7/102; H01C 7/126; H01H 37/002; H01H 37/08; H01H 37/32; H01H 37/761; H01H 37/04; H01H 83/10; H01H 2037/763; H01H 2235/01; H02H 9/04; H01T 1/14; H01T 4/04
See application file for complete search history.

(56) References Cited

U.S. PATENT DOCUMENTS

| | | |
|---|---|---|
| 1,144,029 A | 6/1915 | Creighton |
| 2,158,859 A | 5/1939 | Horikoshi |

(Continued)

FOREIGN PATENT DOCUMENTS

| | | |
|---|---|---|
| CH | 466 427 A | 12/1968 |
| DE | 3111096 A1 | 9/1982 |

(Continued)

OTHER PUBLICATIONS

DuPont 4300 Series Resistors Technical Data Sheet (3 pages) (May 2013).

(Continued)

*Primary Examiner* — Pete T Lee
(74) *Attorney, Agent, or Firm* — Myers Bigel, P.A.

(57) ABSTRACT

A surge protective device (SPD) module includes a varistor and an electrical conductor. The varistor includes a hole defined therein and extending through the varistor. The electrical conductor extends through the hole in the varistor.

22 Claims, 21 Drawing Sheets

(51) Int. Cl.
  *H01H 83/10* (2006.01)
  *H01T 4/04* (2006.01)

(56) References Cited

U.S. PATENT DOCUMENTS

| | | | |
|---|---|---|---|
| 2,311,758 A | 2/1943 | Johansson | |
| 2,971,132 A | 2/1961 | Nash | |
| 3,249,719 A | 5/1966 | Misare et al. | |
| 3,375,405 A | 3/1968 | Fallon et al. | |
| 3,522,570 A | 8/1970 | Wanaselja | |
| 3,711,794 A | 1/1973 | Tasca et al. | |
| 3,743,996 A * | 7/1973 | Harnden, Jr. | H01C 7/10 |
| | | | 338/21 |
| 3,813,577 A | 5/1974 | Kawiecke | |
| 4,015,228 A | 3/1977 | Eda et al. | |
| 4,023,133 A | 5/1977 | Knapp, Jr. | |
| 4,085,397 A | 4/1978 | Yagher, Jr. | |
| 4,092,694 A | 5/1978 | Stetson | |
| 4,217,618 A | 8/1980 | Boney et al. | |
| 4,240,124 A | 12/1980 | Westrom | |
| 4,241,374 A | 12/1980 | Gilberts | |
| 4,249,224 A | 2/1981 | Baumbach | |
| 4,288,833 A | 9/1981 | Howell | |
| 4,355,345 A | 10/1982 | Franchet | |
| 4,425,017 A | 1/1984 | Chan | |
| 4,493,003 A | 1/1985 | Mickelson et al. | |
| 4,571,656 A | 2/1986 | Ruckman | |
| 4,595,635 A | 6/1986 | Dubrow et al. | |
| 4,600,261 A | 7/1986 | Debbaut | |
| 4,638,284 A | 1/1987 | Levinson | |
| 4,701,574 A | 10/1987 | Shimirak et al. | |
| 4,906,963 A | 3/1990 | Ackermann et al. | |
| 4,908,730 A | 3/1990 | Westrom | |
| 4,956,696 A | 9/1990 | Hoppe et al. | |
| 5,006,950 A | 4/1991 | Allina | |
| 5,130,884 A | 7/1992 | Allina | |
| 5,172,296 A | 12/1992 | Kaczmarek | |
| 5,311,164 A | 5/1994 | Ikeda et al. | |
| 5,519,564 A | 5/1996 | Carpenter | |
| 5,523,916 A | 6/1996 | Kaczmarek | |
| 5,529,508 A | 6/1996 | Chiotis et al. | |
| 5,588,856 A | 12/1996 | Collins et al. | |
| 5,621,599 A | 4/1997 | Larsen et al. | |
| 5,652,690 A | 7/1997 | Mansfield et al. | |
| 5,721,664 A | 2/1998 | Uken et al. | |
| 5,724,221 A | 3/1998 | Law | |
| 5,781,394 A | 7/1998 | Lorenz et al. | |
| 5,808,850 A | 9/1998 | Carpenter, Jr. | |
| 5,936,824 A | 8/1999 | Carpenter, Jr. | |
| 5,990,778 A | 11/1999 | Strumpler et al. | |
| 6,038,119 A | 3/2000 | Atkins et al. | |
| 6,094,128 A | 7/2000 | Bennett et al. | |
| 6,172,865 B1 | 1/2001 | Boy et al. | |
| 6,175,480 B1 | 1/2001 | Karmazyn | |
| 6,222,433 B1 | 4/2001 | Ramakrishnan et al. | |
| 6,226,166 B1 | 5/2001 | Gumley et al. | |
| 6,430,019 B1 | 8/2002 | Martenson et al. | |
| 6,430,020 B1 | 8/2002 | Atkins et al. | |
| 6,459,559 B1 | 10/2002 | Christofersen | |
| 6,556,402 B2 | 4/2003 | Kizis et al. | |
| 6,614,640 B2 | 9/2003 | Richter et al. | |
| 6,930,871 B2 | 8/2005 | Macanda | |
| 7,433,169 B2 | 10/2008 | Kamel et al. | |
| 7,558,041 B2 | 7/2009 | Lagnoux | |
| 7,684,166 B2 | 3/2010 | Donati et al. | |
| 7,738,231 B2 | 6/2010 | Lagnoux | |
| 8,493,170 B2 | 7/2013 | Zaeuner et al. | |
| 8,659,866 B2 | 2/2014 | Douglass et al. | |
| 8,743,525 B2 | 6/2014 | Xepapas et al. | |
| 9,349,548 B2 | 5/2016 | Juricev | |
| 9,355,763 B2 | 5/2016 | Xu | |
| 9,570,260 B2 | 2/2017 | Yang et al. | |
| 9,634,554 B2 | 4/2017 | Falk et al. | |
| 9,906,017 B2 | 2/2018 | Tsovilis et al. | |
| 2002/0018331 A1 | 2/2002 | Takahashi | |
| 2002/0024792 A1 | 2/2002 | Cantagrel | |
| 2003/0184926 A1 | 10/2003 | Wu et al. | |
| 2004/0150937 A1 | 8/2004 | Bobert et al. | |
| 2005/0185356 A1 * | 8/2005 | Durth | H01T 1/20 |
| | | | 361/118 |
| 2005/0231872 A1 | 10/2005 | Schimanski et al. | |
| 2006/0245125 A1 | 11/2006 | Aszmus | |
| 2006/0291127 A1 | 12/2006 | Kim et al. | |
| 2007/0217106 A1 | 9/2007 | Lagnoux | |
| 2008/0043395 A1 | 2/2008 | Donati et al. | |
| 2008/0049370 A1 | 2/2008 | Adachi et al. | |
| 2009/0302992 A1 | 12/2009 | Cernicka | |
| 2011/0013330 A1 * | 1/2011 | Crevenat | H01H 83/10 |
| | | | 361/115 |
| 2011/0193674 A1 | 8/2011 | Zäuner et al. | |
| 2011/0248816 A1 | 10/2011 | Duval et al. | |
| 2012/0050935 A1 | 3/2012 | Douglass et al. | |
| 2012/0086539 A1 | 4/2012 | Duval et al. | |
| 2012/0086540 A1 | 4/2012 | Duval et al. | |
| 2012/0206848 A1 * | 8/2012 | Gillespie | H01T 4/06 |
| | | | 361/104 |
| 2012/0250205 A1 | 10/2012 | Pfitzer et al. | |
| 2013/0038976 A1 | 2/2013 | Hagerty | |
| 2013/0200986 A1 | 8/2013 | Koprivsek | |
| 2013/0265685 A1 | 10/2013 | Zäuner et al. | |
| 2013/0335869 A1 | 12/2013 | Xepapas et al. | |
| 2014/0010704 A1 | 1/2014 | Ishida et al. | |
| 2014/0092514 A1 | 4/2014 | Chen | |
| 2014/0292472 A1 | 10/2014 | Qin et al. | |
| 2014/0327990 A1 | 11/2014 | Juricev | |
| 2015/0103462 A1 | 4/2015 | Depping | |
| 2015/0107972 A1 | 4/2015 | Oh | |
| 2015/0270086 A1 | 9/2015 | Chen | |
| 2015/0280420 A1 | 10/2015 | Mao | |
| 2015/0349523 A1 | 12/2015 | Tsovilis et al. | |
| 2016/0087520 A1 | 3/2016 | Falk et al. | |
| 2016/0276821 A1 | 9/2016 | Politis et al. | |
| 2018/0138698 A1 | 5/2018 | Tsovilis et al. | |
| 2018/0151318 A1 | 5/2018 | Kamensek et al. | |
| 2018/0183230 A1 | 6/2018 | Kostakis et al. | |
| 2018/0183232 A1 | 6/2018 | Tavcar et al. | |
| 2018/0330908 A1 | 11/2018 | Vrhunc et al. | |

FOREIGN PATENT DOCUMENTS

| | | |
|---|---|---|
| DE | 3428258 A1 | 2/1986 |
| DE | 4235329 A1 | 4/1994 |
| DE | 69201021 T2 | 5/1995 |
| DE | 4438593 A1 | 5/1996 |
| DE | 19823446 A1 | 11/1999 |
| DE | 19839422 A1 | 3/2000 |
| DE | 19843519 | 4/2000 |
| DE | 20 2004 006 227 U1 | 10/2004 |
| DE | 10323220 A1 | 12/2004 |
| DE | 10 2006 003 274 A1 | 1/2008 |
| DE | 20 2008 004 699 U1 | 6/2008 |
| DE | 10 2007 014 336 A1 | 10/2008 |
| DE | 10 2008 017 423 A1 | 10/2009 |
| DE | 102008026555 | 12/2009 |
| DE | 10 2013 021 936 B3 | 2/2012 |
| DE | 20 2006 021 210 U1 | 9/2013 |
| DE | 102012004678 | 9/2013 |
| DE | 10 2013 103 753 A1 | 10/2013 |
| DE | 10 2013 011 216 B3 | 10/2014 |
| DE | 10 2013 107 807 B3 | 1/2015 |
| DE | 102014016938 | 2/2016 |
| DE | 102014016830 | 9/2016 |
| DE | 102007030653 B4 | 4/2017 |
| EP | 0108518 | 5/1984 |
| EP | 0203737 | 12/1986 |
| EP | 0335479 | 10/1989 |
| EP | 0445054 | 9/1991 |
| EP | 0462694 | 12/1991 |
| EP | 0516416 A1 | 12/1992 |
| EP | 0603428 A | 6/1994 |
| EP | 0785625 A2 | 7/1997 |
| EP | 1094550 A2 | 4/2001 |
| EP | 1102371 | 5/2001 |
| EP | 1116246 A1 | 7/2001 |

(56) References Cited

FOREIGN PATENT DOCUMENTS

| | | |
|---|---|---|
| EP | 1355327 A2 | 10/2003 |
| EP | 1458072 A1 | 9/2004 |
| EP | 0 963 590 B1 | 11/2004 |
| EP | 1798742 A1 | 6/2007 |
| EP | 2075811 A2 | 7/2009 |
| EP | 2707892 | 3/2014 |
| EP | 2725588 | 4/2014 |
| EP | 2953142 A1 | 12/2015 |
| EP | 2954538 B1 | 12/2015 |
| EP | 3001525 A1 | 3/2016 |
| EP | 3240132 | 11/2017 |
| FR | 2 574 589 A1 | 6/1986 |
| FR | 2 622 047 A1 | 4/1989 |
| FR | 2897231 | 8/2007 |
| JP | 60-187002 | 9/1985 |
| JP | 60-226103 | 11/1985 |
| JP | 60-258905 | 12/1985 |
| JP | 61-198701 | 9/1986 |
| JP | 1-176687 | 7/1989 |
| JP | H 05176445 A | 7/1993 |
| JP | 09-326546 | 12/1997 |
| JP | 2002-525861 | 8/2002 |
| JP | 2002-525862 | 8/2002 |
| SI | 9700277 A | 4/1999 |
| SI | 9700332 A | 6/1999 |
| SI | 20781 A | 6/2002 |
| SI | 20782 A | 6/2002 |
| SI | 22030 A | 10/2006 |
| SI | 23303 | 8/2011 |
| SI | 23749 | 11/2012 |
| SI | 24371 A | 11/2014 |
| WO | WO 88/00603 | 1/1988 |
| WO | WO 90/05401 | 5/1990 |
| WO | WO 95/15600 | 6/1995 |
| WO | WO 95/24756 | 9/1995 |
| WO | WO 97/42693 | 11/1997 |
| WO | WO 98/38653 | 9/1998 |
| WO | WO 00/17892 | 3/2000 |
| WO | WO 2007/0117163 A1 | 10/2007 |
| WO | WO 2008/009507 A1 | 1/2008 |
| WO | 2008/104824 | 9/2008 |
| WO | 2011/102811 | 8/2011 |
| WO | WO 2012/026888 A1 | 3/2012 |
| WO | 2012/154134 | 11/2012 |
| WO | WO 2013/044961 A1 | 4/2013 |
| WO | 2016/101776 | 6/2016 |
| WO | WO 2016/110360 A1 | 7/2016 |

OTHER PUBLICATIONS

Formex™ GK/Formex Product Data Flame Retardant Polypropylene Sheet, ITW Formex (4 pages) (2002).

Translation of DIN-Standards, Built-in Equipment for Electrical Installations; Overall Dimensions and Related Mounting Dimensions (15 pages) (Dec. 1988).

VAL-MS-T1/T2 335/12.5/3+1, Extract from the online catalog, Phoenix Contact GmbH & Co. KG, http://catalog.phoenixcontact.net/phoenix/treeViewClick.do?UID=2800184 (7 pages) (May 22, 2014).

Extended European Search Report in corresponding European Application No. 18190871.6 (dated Mar. 22, 2019).

U.S. Appl. No. 15/134,676, Iskra Zascite d.o.o., filed Apr. 21, 2016

Beitz et al. "Dubbel Taschenbuch für den Maschinenbau" (3 pages) (1997).

Data Book Library 1997 Passive Components, Siemens Matsushita Components pp. 15-17, 26-32, 36-37, 39, 161, 166, 167, 169, 171-174 (1997).

Extended European Search Report in corresponding European Application No. 12177955.7 (7 pages) (dated Feb. 27, 2013).

Notification of Transmittal of the International Search Report and Written Opinion of the International Searching Authority issued in corresponding PCT Application No. PCT/GR2013/000030 (12 pages) (dated Jul. 23, 2013).

Oberg et al. "Machinery's Handbook $27^{th}$ Edition—Soldering and Brazing" (4 pages) (2004).

Raycap "Rayvoss™ Transient Voltage Surge Suppression System" webpage <http://www.raycap.com/surge/rayvoss.htm> accessed on Nov. 29, 2005 (1 page) (Date Unknown; Admitted Prior Art).

Raycap "Revolutionary Lightning Protection Technology" Raycap Corporation Press Release, webpage <http://www.raycap.com/news/020930.htm> accessed on Nov. 29, 2005 (1 page) (Date Unknown; Admitted Prior Art).

Raycap "The Ultimate Overvoltage Protection: Rayvoss™" brochure (4 pages) (Date Unknown; Admitted Prior Art).

Rayvoss™ "The Ultimate Overvoltage Protection" webpage <http://www.rayvoss.com> accessed on Nov. 29, 2005 (2 pages) (Date Unknown; Admitted Prior Art).

Rayvoss™ "Applications" webpage <http://www.rayvoss.com/applications.htm> accessed on Nov. 29, 2005 (4 pages) (undated).

Rayvoss™ "Frequently Asked Questions" webpage <http://www.rayvoss.com/faq.htm> access on Nov. 29, 2005 (2 pages) (Date Unknown; Admitted Prior Art).

Rayvoss™ "Technical Information" webpage <http://www.rayvoss.com/tech_info.htm> accessed on Nov. 29, 2005 (3 pages) (Date Unknown; Admitted Prior Art).

Raycap "The Next Generation Surge Protection Rayvoss™" brochure (4 pages) (May 4, 2012).

Raycap "The Ultimate Overvoltage Protection Rayvoss™" brochure (4 pages) (2005).

Raycap "The Ultimate Overvoltage Protection Rayvoss™" brochure (4 pages) (Jan. 2009).

Raycap "Strikesorb® 30 Series OEM Surge Suppression Solutions" brochure (2 pages) (Apr. 17, 2009).

* cited by examiner

SURGE PROTECTIVE DEVICE MODULES AND SYSTEMS INCLUDING SAME

FIELD OF THE INVENTION

The present invention relates to surge protective devices and, more particularly, to surge protective devices including varistors.

BACKGROUND OF THE INVENTION

Frequently, excessive voltage or current is applied across service lines that deliver power to residences and commercial and institutional facilities. Such excess voltage or current spikes (transient overvoltages and surge currents) may result from lightning strikes, for example. The above events may be of particular concern in telecommunications distribution centers, hospitals and other facilities where equipment damage caused by overvoltages and/or current surges is not acceptable and resulting down time may be very costly.

Typically, sensitive electronic equipment may be protected against transient overvoltages and surge currents using surge protective devices (SPDs). For example, an overvoltage protection device may be installed at a power input of equipment to be protected, which is typically protected against overcurrents when it fails. Typical failure mode of an SPD is a short circuit. The overcurrent protection typically employed is a combination of an internal thermal disconnector to protect the device from overheating due to increased leakage currents and an external fuse to protect the device from higher fault currents. Different SPD technologies may avoid the use of the internal thermal disconnector because, in the event of failure, they change their operation mode to a low ohmic resistance.

In the event of a surge current in a line L (e.g., a voltage line of a three phase electrical power circuit), protection of power system load devices may necessitate providing a current path to ground for the excess current of the surge current. The surge current may generate a transient overvoltage between the line L and the neutral line N (the neutral line N may be conductively coupled to an earth ground PE). Since the transient overvoltage significantly exceeds the operating voltage of the SPD, the SPD will become conductive, allowing the excess current to flow from line L through SPD to the neutral N. Once the surge current has been conducted to neutral N, the overvoltage condition ends and the SPD may become non-conducting again. However, in some cases, one or more SPDs may begin to allow a leakage current to be conducted even at voltages that are lower that the operating voltage of the SPDs. Such conditions may occur in the case of an SPD deteriorating.

SUMMARY

According to embodiments of the invention, a surge protective device (SPD) module includes a varistor and an electrical conductor. The varistor includes a hole defined therein and extending through the varistor. The electrical conductor extends through the hole in the varistor.

In some embodiments, the hole extends fully through a thickness of the varistor, and the electrode extends fully through the hole. In some embodiments, the hole has a depth of at least 1 mm.

According to some embodiments, the electrical conductor is an electrode.

According to some embodiments, the electrode includes a contact portion electrically connected to a contact surface of the varistor, and an integral extension portion extending through the hole.

In some embodiments, the extension portion extends transversely to the contact portion.

In some embodiments, the integral extension portion is a terminal tab and projects outwardly beyond a second surface of the varistor opposite the first contact surface. In some embodiments, the terminal tab projects outwardly beyond the second surface of the varistor a distance in the range of from about 0.1 mm to 15 mm.

According to some embodiments, the SPD module includes a module housing, first and second module electrical terminals mounted on the module housing, and a thermal disconnector mechanism. The varistor is electrically connected between the first and second module electrical terminals. The thermal disconnector mechanism is positioned in a ready configuration, wherein the varistor is electrically connected with the second module electrical terminal. The thermal disconnector mechanism is repositionable to electrically disconnect the varistor from the second module electrical terminal. The thermal disconnector mechanism includes a disconnect spring elastically deflected and electrically connected to the extension portion of the electrode in the ready configuration. The thermal disconnector mechanism further includes a solder securing the disconnect spring in electrical connection with the extension portion of the electrode in the ready configuration. The solder is meltable in response to overheating in the SPD module. The disconnect spring is configured to electrically disconnect the varistor from the second module electrical terminal when the solder is melted.

In some embodiments, the extension portion is a terminal tab and projects outwardly beyond a second surface of the varistor opposite the contact surface.

In some embodiments, the SPD module includes a weak region in the disconnect spring. The disconnect spring is configured to break at the weak region in response to a current through the disconnect spring to electrically disconnect the varistor from the second module electrical terminal.

In some embodiments, the SPD module includes an indicator mechanism configured to provide an alert that the SPD module has failed when the thermal disconnector mechanism disconnects the overvoltage clamping element from the second module electrical terminal.

In some embodiments, the indicator mechanism includes a local alert mechanism including: a window in the module housing; an indicator member movable between a ready position and an indicating position relative to the window; and an indicator spring configured to force the indicator member from the ready position to the indicating position when the thermal disconnector mechanism disconnects the varistor from the second module electrical terminal.

According to some embodiments, the indicator mechanism includes a remote alert mechanism including: a switch opening in the module housing to receive a switch pin from an external base assembly; a blocking member covering the switch opening; and an indicator spring configured to force the blocking member away from the switch opening when the thermal disconnector mechanism disconnects the varistor from the second module electrical terminal to permit the switch pin to extend through the switch opening.

According to some embodiments, the SPD module includes a module housing, first and second module electrical terminals mounted on the module housing, and a second electrode. The second electrode includes a second contact portion connected to a second surface of the varistor opposite the first contact surface. The extension portion of the first electrode electrically connects the first contact surface of the varistor to the second module electrical terminal. The second electrode electrically connects the second contact surface of the varistor to the first module electrical terminal.

In some embodiments, the SPD module includes a second varistor having a first contact surface facing the first varistor. The contact portion of the first electrode is interposed between the first varistor and the second varistor. The second electrode electrically connects the first contact surface of the second varistor to the first module electrical terminal.

According to some embodiments, the SPD module includes a gas discharge tube (GDT) electrically connected between the second electrode and the first module electrical terminal.

In some embodiments, the SPD module includes a third electrode electrically connected between the GDT and the first module electrical terminal.

In some embodiments, the SPD module includes a second varistor having a first contact surface facing the first varistor. The contact portion of the electrode is interposed between the first varistor and the second varistor. The contact portion of the electrode is electrically connected to the first contact surface of the second varistor.

In some embodiments, the SPD module includes: a module housing; first and second module electrical terminals mounted on the module housing, wherein the varistor is electrically connected between the first and second module electrical terminals; and a thermal disconnector mechanism. The thermal disconnector mechanism is positioned in a ready configuration, wherein the varistor is electrically connected with the second module electrical terminal. The thermal disconnector mechanism is repositionable to electrically disconnect the varistor from the second module electrical terminal. The thermal disconnector mechanism includes the electrical conductor extending through the hole in the varistor and electrically connected to the varistor in the ready configuration. The thermal disconnector mechanism further includes a solder securing the electrical conductor in electrical connection with the varistor in the ready configuration, wherein: the solder is meltable in response to overheating in the SPD module; and the thermal disconnector mechanism is configured to electrically disconnect the electrical conductor from the varistor and thereby disconnect the varistor from the second module electrical terminal when the solder is melted.

According to embodiments of the invention, a DIN rail surge protective device (SPD) system includes a base and an SPD module. The base is configured to be mounted on a DIN rail. The base defines a receiver slot. The SPD module is configured to be removably mounted in the receiver slot to form with the base a DIN rail SPD assembly. The SPD module includes a varistor including a hole defined therein and extending through the varistor, and an electrical conductor extending through the hole in the varistor.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

The accompanying drawings, which form a part of the specification, illustrate embodiments of the present invention.

DETAILED DESCRIPTION OF EMBODIMENTS OF THE INVENTION

Figure 1:
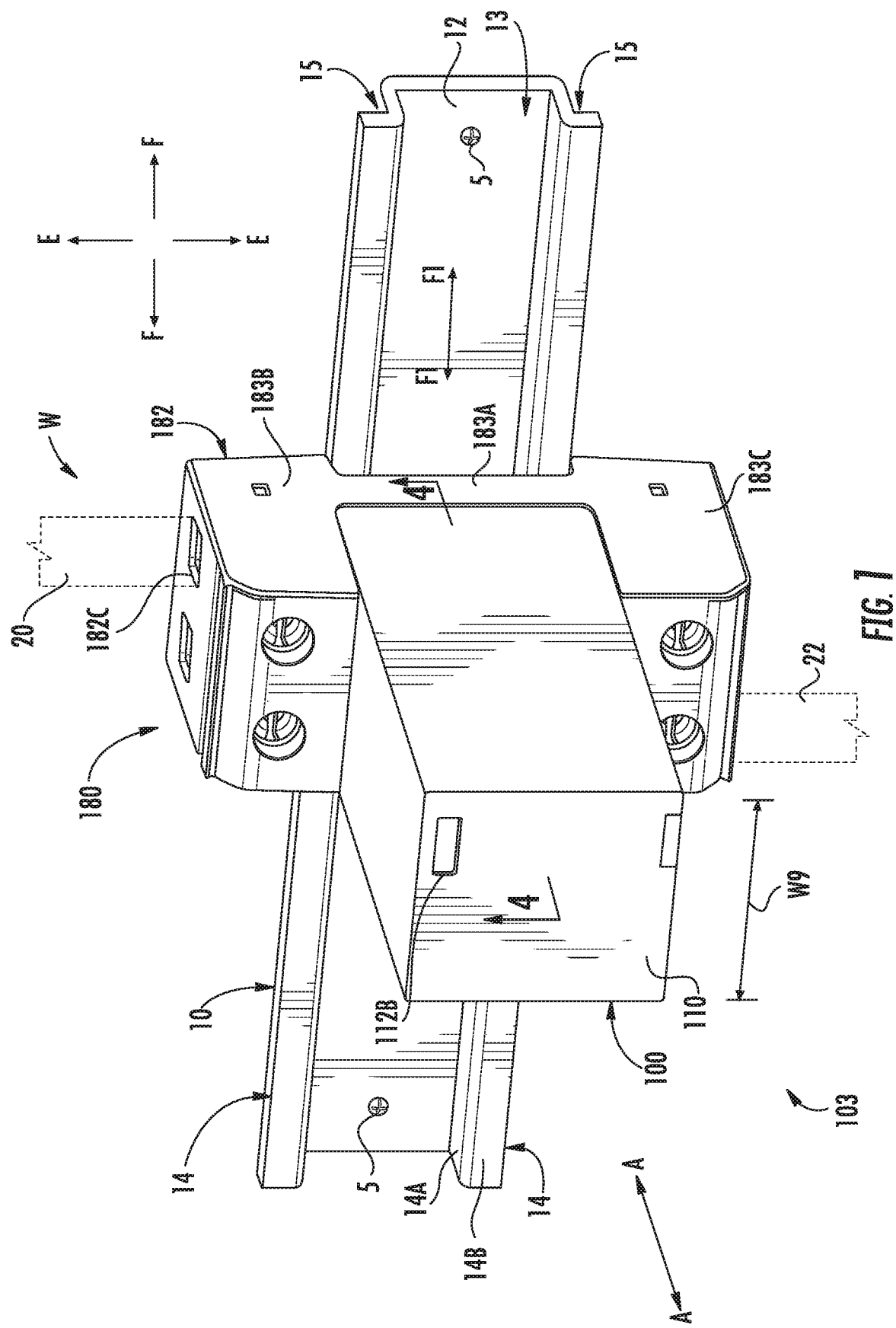
FIG. 1 is a top, front perspective view of an SPD assembly according to embodiments of the invention mounted on a DIN rail.
Figure 2:
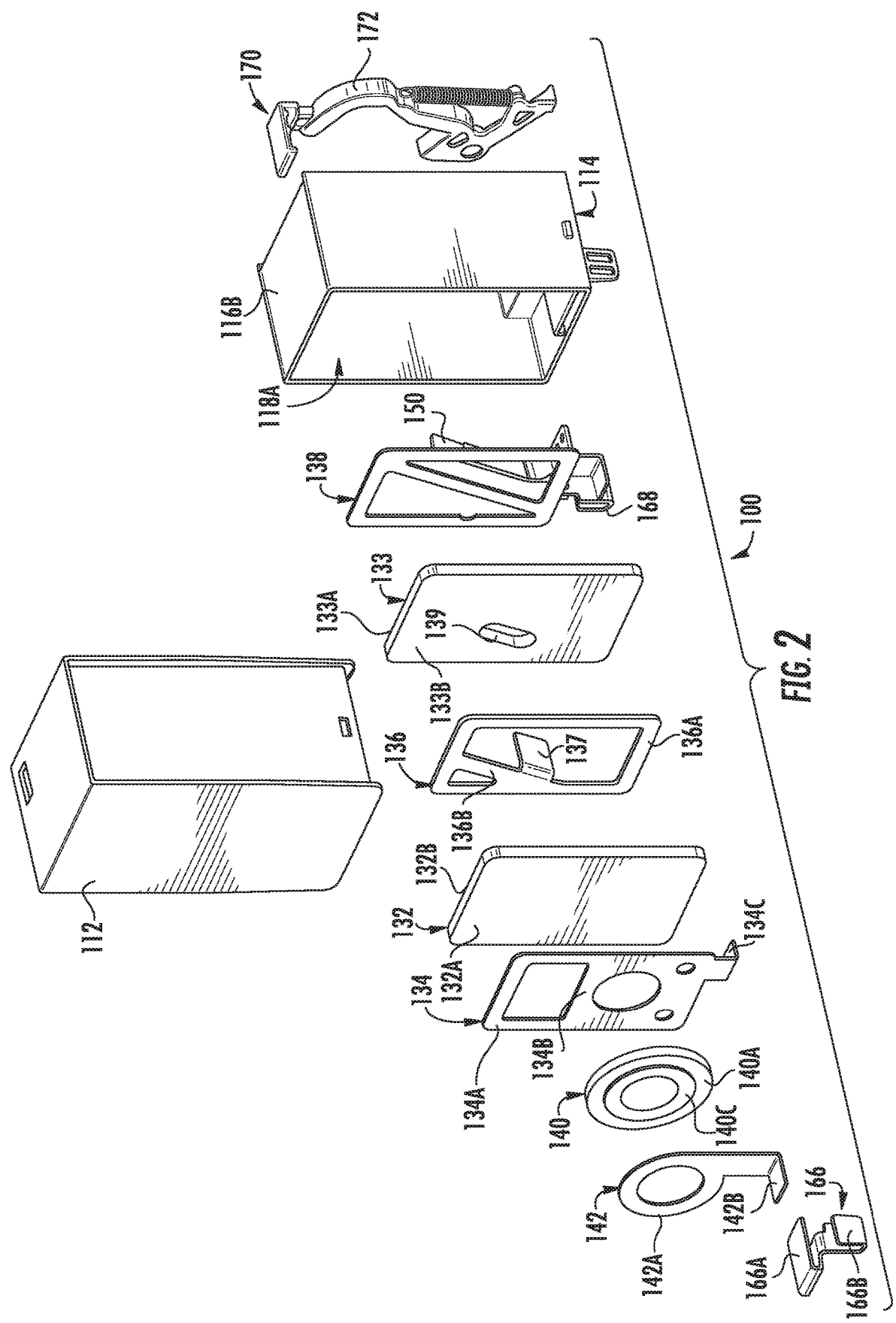
FIG. 2 is an exploded, front, left side perspective view of an SPD module forming a part of the SPD assembly of FIG. 1.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "monolithic" means an object that is a single, unitary piece formed or composed of a material without joints or seams. Alternatively, a unitary object can be a composition composed of multiple parts or components secured together at joints or seams.

With reference to FIGS. 1-14, a transient voltage surge suppression (TVSS) or surge protective device (SPD) assembly 101 and an SPD system 103 according to embodiments of the present invention are shown therein. The SPD assembly 101 and system 103 include an SPD module 100 and a pedestal or base 180. The SPD module 100 is pluggable into the base 180.

According to some embodiments and as shown, the SPD assembly 101 is configured, sized and shaped for mounting on a support rail 10 (e.g., DIN rail 10 shown in FIG. 1) and is compliant with corresponding applicable DIN requirements or standards. The DIN rail 10 may be secured (e.g., by screws 5 or other fasteners) to a suitable support structure such as a wall W, for example, a rear wall of an electrical service utility cabinet. The base 180 is removably mountable on the DIN rail 10. The pluggable surge protective device (SPD) module 100 is in turn removably mountable on the base 180.

In some embodiments, the maximum dimensions of the SPD assembly 101 are compliant with at least one of the following DIN (Deutsches Institut für Normung e.V.) Standards: DIN 43 880 (December 1988). In some embodiments, the maximum dimensions of the assembly 101 are compliant with each of these standards.

According to some embodiments and as shown, the rail 10 is a DIN rail. That is, the rail 10 is a rail sized and configured to meet DIN specifications for rails for mounting modular electrical equipment.

The DIN rail 10 has a rear wall 12 and integral, lengthwise flanges 14 extending outwardly from the rear wall 12. Each flange 14 includes a forwardly extending wall 14A and an outwardly extending wall 14B. The walls 12, 14 together form a lengthwise extending front, central channel 13 and opposed, lengthwise extending, rear, edge channels 15. Mounting holes may be provided extending fully through the wall 12 and to receive fasteners 5 (e.g., threaded fasteners or rivets) for securing the rail 10 to a support structure (e.g., a wall or panel). The DIN rail 10 defines a DIN rail plane E-F and has a lengthwise axis F1-F1 extending in the plane E-F. DIN rails of this type may be referred to as "top hat" support rails.

According to some embodiments, the rail 10 is a 35 mm (width) DIN rail. According to some embodiments, the rail 10 is formed of metal and/or a composite or plastic material.

The assembly 100 has a DIN rail device assembly axis A-A (FIG. 1) that extends transversely to and, in some embodiments, substantially perpendicular to the axis F1-F1 of the DIN rail 10. In some embodiments, the DIN rail mount assembly axis A-A extends transversely to and, in some embodiments, substantially orthogonal to the plane E-F of the DIN rail 10. As used herein, "front" or "distal" refers to the end farther away from the DIN rail 10 when the assembly 101 is mounted on the DIN rail 10, and "rear" or "proximal" refers to the end nearer the DIN rail 10.

The base 180 (FIGS. 1, 13 and 14) includes a housing 182. The housing 182 includes a rear section 183A, an upper leg or section 183B, and a lower leg or section 183C. The housing 182 defines an enclosed internal cavity. According to some embodiments, the housing 182 is formed of an electrically insulating polymeric material. The housing 182 may be formed of any suitable material or materials. In some embodiments, the housing 182 is formed of a rigid polymeric material or metal (e.g., aluminum). Suitable polymeric materials may include polyamide (PA), polypropylene (PP), polyphenylene sulfide (PPS), or ABS, for example.

A DIN rail receiver channel 182F is defined in the rear side of the rear section 183A. Integral rail hook features 18211 are located on one side of the channel 182F and a spring loaded DIN rail latch mechanism 182G is mounted on the other side of the channel 182F. The features and components 182F, 182G, 18211 are sized and configured to securely and releasably mount the base 180 on a standard DIN rail 10 as is known in the art.

A receiver slot 183D is defined in the front side of the base 180 by the sections 183A-C. The receiver slot 183D has a front opening and is open on either side. The receiver slot 183D extends axially from the opening along the axis A-A and is terminated by the front side of the rear section 183A.

A base terminal electrical connector assembly 184, 186 is mounted in each of the upper and lower sections 183B, 183C. Each connector assembly 184, 186 includes a cable clamp connector 185A and a terminal contact connector socket 185B. A cable port 182C is defined in each of the upper and lower sections 183B, 183C to receive a terminal end of an electrical cable 20, 22 into the corresponding cable clamp connector 185A. A driver port 185C is provided in each section 183B, 183C to receive a driver to operate a threaded member (e.g., screw) 185D of the associated cable clamp connector 185A.

Upper and lower contact openings 182E are defined in the front side or wall of the rear section 183A.

A switch 188 is disposed in the housing 182. The switch 188 includes a spring-loaded remote control pin 188A that projects forwardly from the front side of the rear section 183A. The switch 188 further includes switch electronics 188B mounted on a PCB 188E and connected to the control pin 188A and an output electrical connector 188D.

The SPD module 100 includes a housing 110, an overvoltage clamping element assembly 130, an integral thermal disconnector mechanism 151, an integral indicator mechanism 170 (including a local alarm mechanism 107, and a remote alarm mechanism 108), a first fail-safe mechanism 102, and a second fail-safe mechanism 104 disposed in the housing 110, as discussed in more detail below. The SPD module 100 further includes potting P (shown only in FIG. 4), a first electrical contact member 166, and a second electrical contact member 168.

The housing 110 includes an inner housing member or frame 114 and an outer housing member or cover 112 collectively forming the housing 110. The housing 110 defines an internal chamber or cavity.

A front indicator opening or window 112B is provided on a front wall of the cover 112. The indicator window 112B may serve to visually indicate a change in status of the module 100, as discussed below.

The frame 114 includes a partition wall 116A separating the cavity of the housing 110 into opposed cavities 118A and 118B. An electrical conductor or electrode slot 120 is defined in the partition wall 116A and connects the cavities 118A, 118B. The frame 114 includes a front wall 116B and a rear wall 116C. A switch opening 122 is defined in the rear wall 116C.

Figure 3:
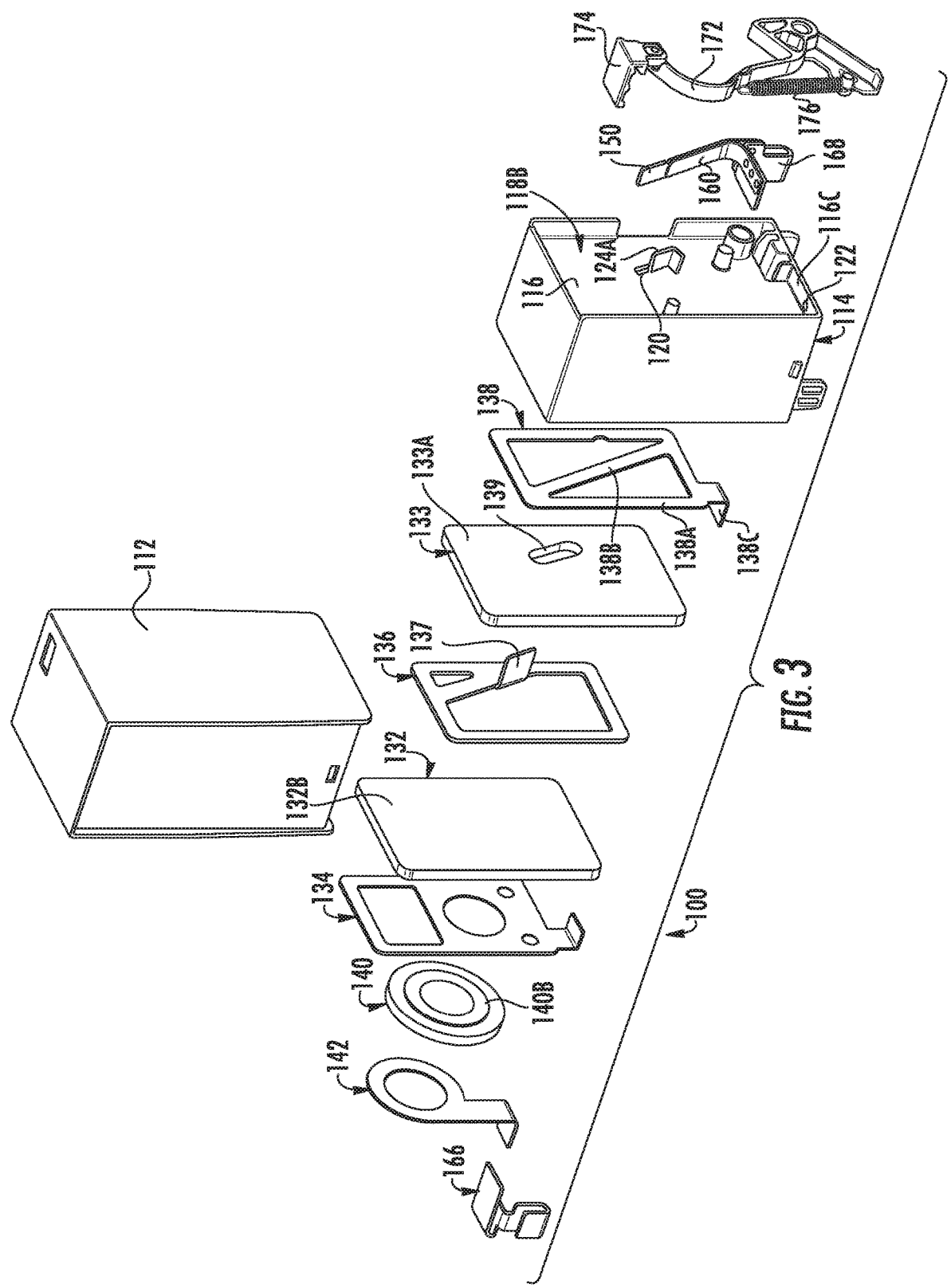
FIG. 3 is an exploded, front, right side view of the SPD module of FIG. 2.
Figure 4:
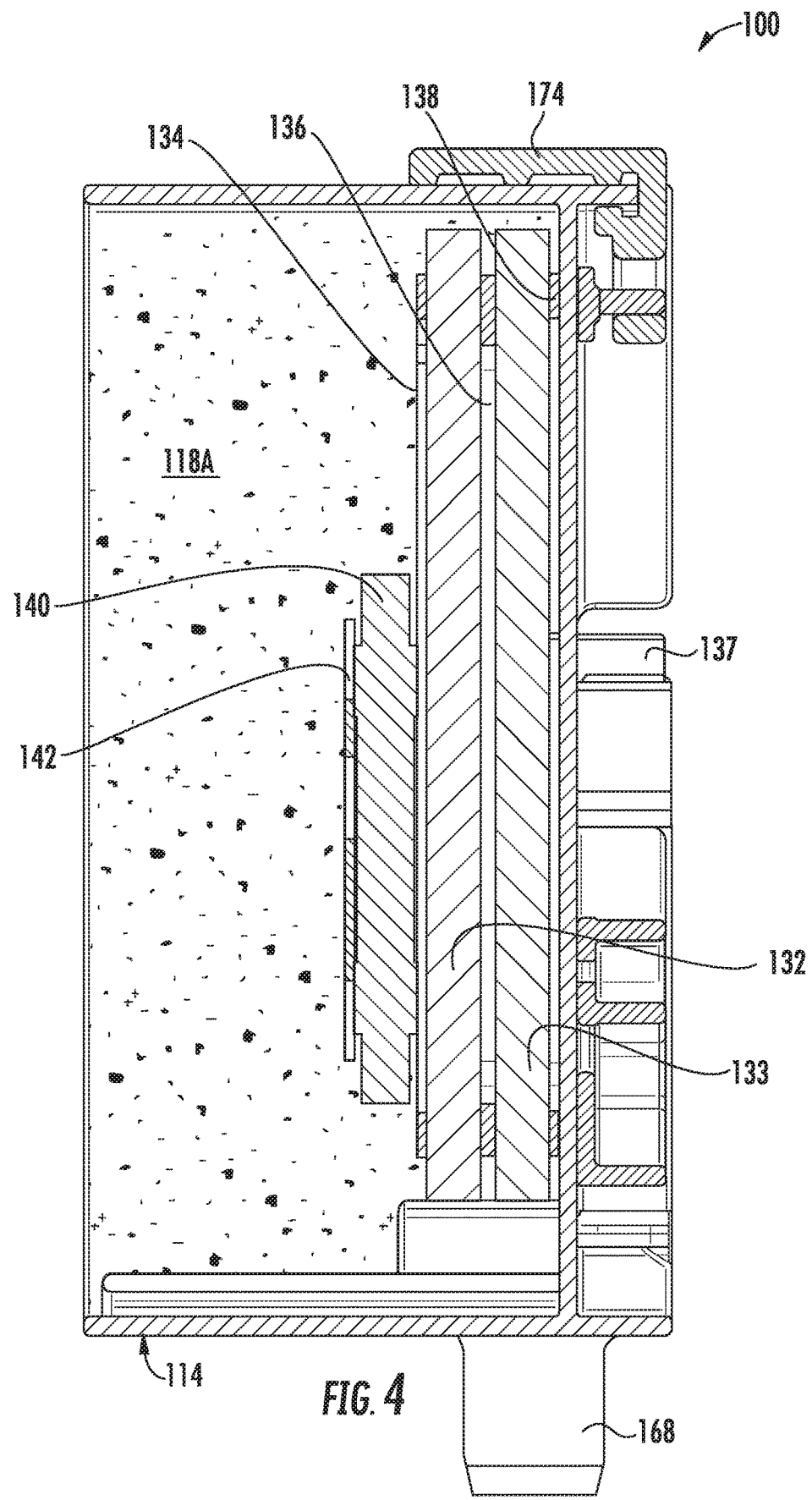
FIG. 4 is a cross-sectional view of the SPD module of FIG. 2 taken along the line 4-4 of FIG. 1 with a cover of the SPD module removed.

An integral reinforcement structure 124, an integral spring anchor post 126A, an integral pivot post 126B, and a spring brace post 126C each project laterally into the cavity 118B from the partition wall 116A. The reinforcement structure 124 has a substantially planar platform or engagement surface 124A (FIG. 3).

The housing members 112, 114 may be formed of any suitable material or materials. In some embodiments, each of the housing members 112, 114 is formed of a rigid polymeric material. Suitable polymeric materials may include polyamide (PA), polypropylene (PP), polyphenylene sulfide (PPS), or ABS, for example.

In some embodiments and as shown, the overvoltage clamping element assembly 130 includes a first varistor 132, a second varistor 133, a first electrode 134, a second electrode 136, a third electrode 138, a gas discharge tube (GDT) 140, and a GDT electrode 142.

The first varistor 132 has opposed contact surfaces 132A, 132B. Metallization layers may cover the contact surfaces 132A, 132B.

The second varistor 133 has opposed contact surfaces 133A, 133B. Metallization layers may cover the contact surfaces 133A, 133B. The second varistor 133 further includes an aperture, opening or hole 139 defined therein by an interior sidewall 133C. The hole 139 extends fully through the thickness of the second varistor 133 from the contact surface 133A to the contact surface 133B. The hole 139 defines a hole axis Q-Q (FIG. 12) that extends transversely to a plane N-N (FIG. 12) defined by the surface 133A of the varistor 133.

The thickness and the diameter of each of the varistors 132, 133 will depend on the varistor characteristics desired for the particular application. In some embodiments, each varistor 132, 133 has a width W1 (FIG. 12) to thickness T1 (FIG. 12) ratio of at least 2. In some embodiments, the thickness T1 of each varistor 132, 133 is in the range of from about 0.75 to 15 mm.

The varistor material of the varistors 132, 133 may be any suitable material conventionally used for varistors, namely, a material exhibiting a nonlinear resistance characteristic with applied voltage. In some embodiments, varistors 132, 133 are metal oxide varistors (MOV). Preferably, the resistance becomes very low when a prescribed voltage is exceeded. The varistor material may be a doped metal oxide or silicon carbide, for example. Suitable metal oxides include zinc oxide compounds.

The first electrode 134 includes a perimeter portion 134A, a cross or brace leg 134B, and an integral terminal tab 134C. The portions 134A and 134B collectively form a contact portion. The first electrode 134 is electrically conductive. In some embodiments, the first electrode 134 is formed of metal. Suitable metals may include nickel brass or copper alloys such as CuSn 6 or Cu-ETP. In some embodiments, the first electrode 134 is unitary (composite or monolithic) and, in some embodiments, the first electrode 134 is monolithic.

The second electrode 136 includes a perimeter portion 136A, a cross or brace leg 136B, and a terminal tab 137. The portions 136A and 136B collectively form a contact portion and the terminal tab 137 forms an extension portion.

Figure 11:
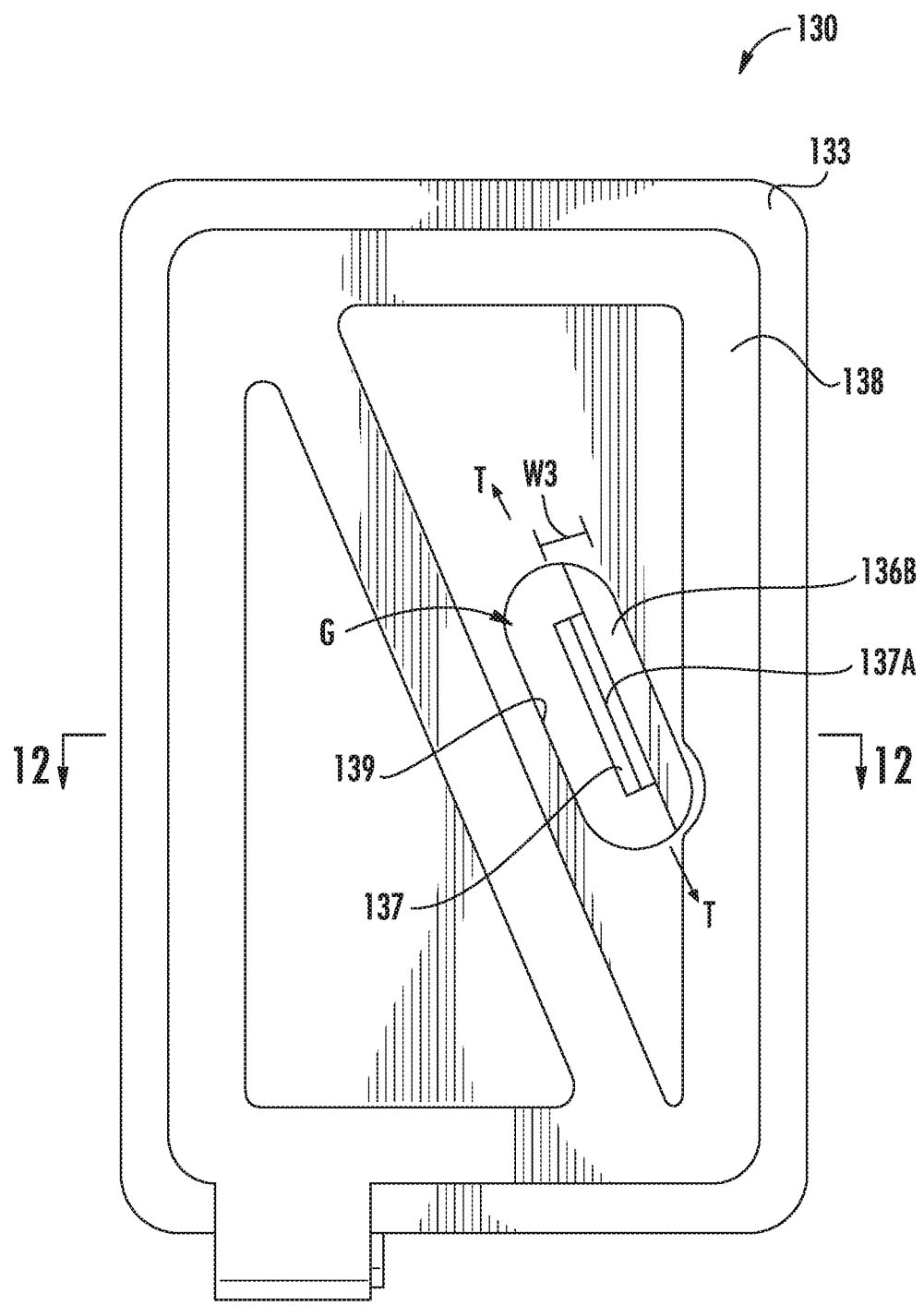
FIG. 11 is a right side view of the overvoltage clamping element assembly of FIG. 10.
Figure 12:
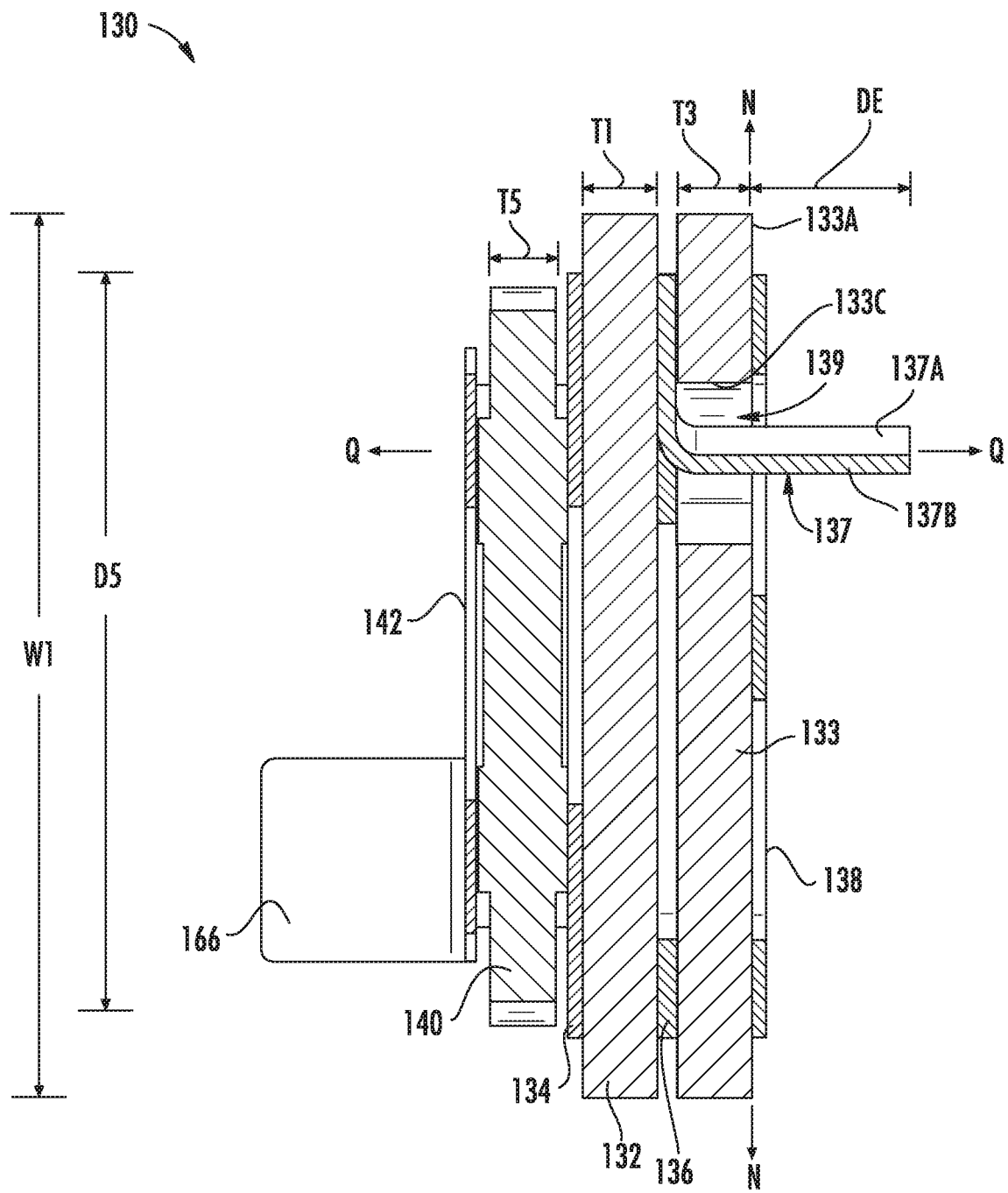
FIG. 12 is a cross-sectional view of the overvoltage clamping element assembly of FIG. 10 taken along the line 12-12 of FIG. 11.

The terminal tab 137 has a substantially planar contact surface 137A defining a tab plane T-T (FIG. 11). In some embodiments, the tab plane T-T is transverse to and, in some embodiments, substantially orthogonal to the plane N-N (FIG. 12) defined by the contact surface 133A.

The second electrode 136 is electrically conductive. In some embodiments, the second electrode 136 is formed of metal. Suitable metals may include nickel brass or copper alloys such as CuSn 6 or Cu-ETP In some embodiments, the second electrode 136 is unitary (composite or monolithic) and, in some embodiments, the second electrode 136 is monolithic.

The third electrode 138 includes a perimeter portion 138A, a cross or brace leg 138B, and an integral terminal tab 138C. The portions 138A and 138B collectively form a contact portion. The third electrode 138 is electrically conductive. In some embodiments, the third electrode 138 is formed of metal. Suitable metals may include nickel brass or copper alloys such as CuSn 6 or Cu-ETP. In some embodiments, the third electrode 138 is unitary (composite or monolithic) and, in some embodiments, the third electrode 138 is monolithic.

The second electrode 136 is interposed or sandwiched between the varistors 132, 133, and the first and third electrodes 134 and 138 are mounted on the outer surfaces 132A and 133A of the varistors 132 and 133, respectively. More particularly, the first electrode 134 is bonded to the metallization layer of the contact surface 132A by solder and the second electrode 136 is bonded to the metallization layer of the contact surface 132B by solder so that the electrodes 134 and 136 are electrically connected to the contact surfaces 132A and 132B, respectively. The third electrode 138 is bonded to the metallization layer of the contact surface 133A by solder and the second electrode 136 is bonded to the metallization layer of the contact surface 133B by solder so that the electrodes 138 and 136 are electrically connected to the contact surfaces 132A and 132B, respectively.

The terminal tab 137 serves as an electrical conductor that extends laterally through the hole 139 in the varistor 133. A section 137B of the terminal tab 137 projects laterally a prescribed extension distance DE (FIG. 12) laterally beyond the surface 133A of the varistor 133.

According to some embodiments, the prescribed extension distance DE is in the range of from about 0.1 mm to 15 mm.

According to some embodiments, the hole 139 has an area in the range of from about 1 mm$^2$ to 50 mm$^2$. According to some embodiments, the hole 139 has a depth T3 (FIG. 12) in the range of from about 1 mm to 20 mm.

The terminal tab 137 is electrically isolated from the sidewall 133C and the contact surface 133A, except when current is conducted through the varistor 133. In some embodiments, the entirety of terminal tab 137 is spaced apart from the sidewall 133C by a surrounding gap G. According to some embodiments, the gap G has a minimum width W3 (FIG. 11) in the range or from about 0.1 mm to 10 mm. The gap G may be an air gap or may be filled with an electrically insulating material. The hole 139 may have any suitable shape. In some embodiments, the shape of the hole 139 roughly corresponds to the shape of the terminal tab 137. For example, in the illustrated embodiment, the hole 139 is an elongate slot having a lengthwise axis substantially aligned with the elongate width of the terminal tab 137.

The overvoltage clamping element assembly 130 is contained in the cavity 118A such that the terminal tab 137 extends through the slot 120 and into the cavity 118B. The remainder of the space in the cavity 118A is filled with the potting P.

The GDT 140 includes a body 140A and an anode terminal 140B and a cathode terminal 140C on opposed ends of the body 140A. The body 140A contains an anode, a cathode and a spark gap chamber as is known in the art.

In some embodiments and as shown, the GDT 140 is wafer or disk-shaped with the electrical terminals 140B and 140C located on the major opposed faces of the body 140A. An annular electrical insulator (e.g., ceramic) may surround the body 140A between the terminals 140B, 140C. In some embodiments and as illustrated, the outer faces of the terminals 140B, 140C are substantially flat and planar or include a substantially flat or planar circular or annular contact region.

The body 140A includes a hermetically or gas-tight sealed chamber or cell in which a selected gas is contained. The terminals 140B, 140C are electrically connected to the gas (e.g., by respective electrode portions in fluid contact with the contained gas). Below a prescribed spark over the voltage, the GDT 140 is electrically insulating between the terminals 140B, 140C. When an applied voltage across the terminals 140B, 140C exceeds the prescribed spark over voltage, the contained gas is ionized to cause electrical current to flow through the gas (by the Townsend discharge process) and thereby between the terminals 140B, 140C. Thus, the GDT 140 will selectively electrically insulate or conduct, depending on the applied voltage. The voltage required to initiate and sustain electrical conduction (discharge) will depend on the design characteristics of the GDT 140 (e.g., geometry, gas pressure, and gas composition).

According to some embodiments, the ratio of the diameter D5 (FIG. 12) of the GDT 140 to its thickness T5 (FIG. 12) is in the range of from about 2 to 20. According to some embodiments, the thickness T5 of the GDT 140 is in the range of from about 1 mm to 20 mm. In some embodiments, the diameter D5 of the GDT 140 is in the range of from about 1 mm to 45 mm. In some embodiments, the GDT 140 has surge current and energy withstand capabilities at least as great as those of the MOV varistor wafers 132, 133 (combined) used in series with the GDT 140.

Suitable GDTs may include Class I and Class II GDTs. Suitable GDTs may be rated at impulse currents from 5 kA to 150 kA and maximum continuous operating voltage from 75 V to 750 V. Suitable GDTs may include the Flat Gas Discharge Tube Type 3L30-25 rated at 600V GDT available from Iskra Zascite d.o.o. of Slovenia, or the D20-A800XP GDT of TDK-EPC Corporation of Japan (EPCOS).

The anode terminal 140B is mechanically secured and electrically connected to the first electrode 134 by solder, for example.

The GDT electrode 142 includes a GDT contact portion 142A and a terminal contact portion 142B. The contact portion 142A is annular and configured to substantially match the cathode terminal 140C of the GDT 140. The GDT electrode 142 is electrically conductive. In some embodiments, the GDT electrode 142 is formed of metal. Suitable metals may include nickel brass or copper alloys such as CuSn 6 or Cu-ETP In some embodiments, the GDT electrode 142 is unitary (composite or monolithic) and, in some embodiments, the GDT electrode 142 is monolithic.

The GDT electrode 142 is mechanically secured and electrically connected to the cathode terminal 140C of the GDT 140 by solder, for example.

Figure 5:
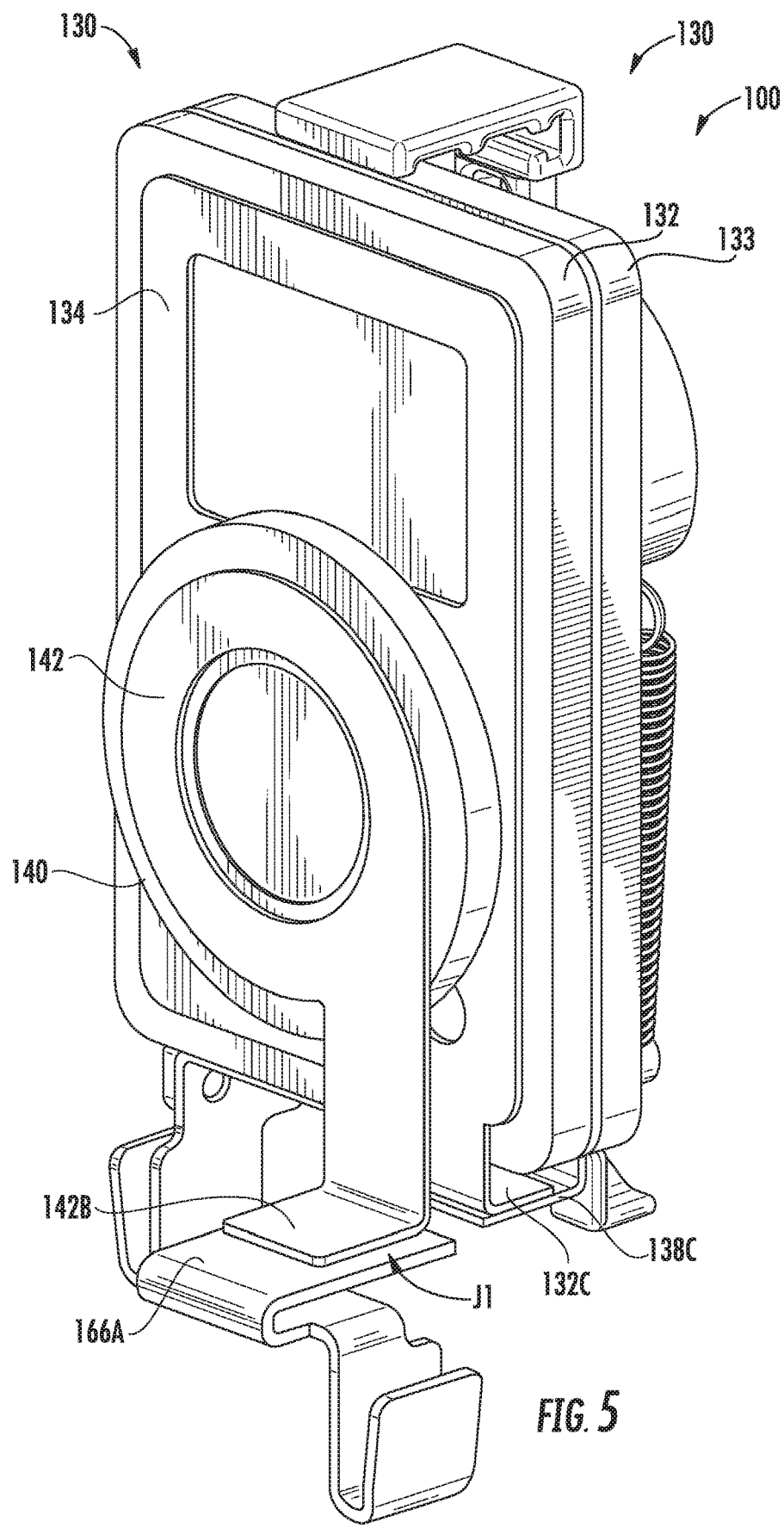
FIG. 5 is a fragmentary, front, left side perspective view of the SPD module of FIG. 2.

The first electrical contact member 166 (FIG. 2) includes a base 166A and an integral U-shaped module terminal connector 166B. The base 166A is secured to the terminal contact tab 142B of the GDT electrode 142 by solder or welding, for example, at a joint J1 (FIG. 5).

The relative positions of the GDT electrode 142 and the base 166A can be adjusted or varied when forming the joint J1 during manufacture. For example, the lateral position of the contact member 166 relative to the GDT electrode 142 can be adjusted and then secured (e.g., by solder or welding) to accommodate varistors 132, 133 of different thicknesses. This floating contact or joint can allow varistors 132, 133 of different thicknesses to be assembled using the same GDT electrode 142.

The contact member 166 may be formed of any suitable material or materials. In some embodiments, the contact member 166 is formed of metal. Suitable metal materials may include nickel brass, CuSn 0.15, CuSN 6, CuP 0.008, for example. In some embodiments, the contact member 166 is unitary and, in some embodiments, is monolithic.

The terminal tab 134C of the first electrode and the terminal tab 138C of the third electrode 138 overlap and engage one another at the base of the varistors 132, 133 to provide electrical contact and continuity between the electrodes 132, 133. The electrode 134 (and thereby the electrode 138) is electrically connected to the GDT electrode 142 (and thereby the contact member 166) when the GDT 140 is activated to conduct current.

The thermal disconnector mechanism 151 includes a disconnect spring 150, a supplemental spring 160, and a layer of solder 159.

The disconnect spring 150 includes a base leg 152 and a cantilevered free leg joined to the base leg 152 by a radiused bend 153. The free leg includes a lower portion 154A proximate the bend 153 and an upper contact portion 154B distal from the bend 153. The contact portion 154B includes an inner contact face facing the terminal tab 137. A weak region 156 is located in the spring 150 between the lower portion 154A and the contact portion 154B. The weak region 156 includes a notch 156A defined in the side edge of the spring 150. As a result, the spring 150 has a reduced cross-sectional area at the weak region 156.

According to some embodiments, the spring 150 has a thickness T2 (FIG. 7) in the range of from about 0.2 mm to 1 mm. According to some embodiments, the thickness T2 of the spring 150 is substantially uniform from end to end.

According to some embodiments, the spring 150 has a width W2 (FIG. 6) in the range of from about 3 mm to 10 mm. According to some embodiments, the width W2 of the spring 150 is substantially uniform from end to end.

According to some embodiments, the length of the lower portion 154A is in the range of from about 15 mm to 35 mm.

According to some embodiments, the length L2B of the contact portion 154B is in the range of from about 2 mm to 15 mm.

The spring 150 may be formed of any suitable material or materials. In some embodiments, the spring 150 is formed of metal. Suitable metal materials may include CuSn 0.15 alloy (bronze), nickel brass, CuSn6, Cu-ETP, oxygen free copper, for example. According to some embodiments, the spring 150 has a restoring force in the ready position (FIG. 6) in the range of from about 5 N to 30 N. According to some embodiments, the spring is formed of a material (e.g., a metal) having a softening temperature greater than 300° C. In some embodiments, the spring 150 is unitary (composite or monolithic) and, in some embodiments, the spring 150 is monolithic. In some embodiments, the spring 150 is formed (e.g., cut and bent) from sheet metal.

According to some embodiments, the spring 150 has an electrical conductivity of at least 14 nΩ·m (at 20° C.).

The supplemental spring 160 includes a base leg 162 and a cantilevered free leg 164 joined to the base leg 162 by a radiused bend. The free leg 164 extends from the bend to a distal terminal end 164A. The terminal end 164A is located proximate the weak region 156. The free leg 164 may be substantially coextensive with the lower leg 154A.

According to some embodiments, the spring 160 has a thickness in the range of from about 0.2 mm to 0.9 mm. According to some embodiments, the thickness of the spring 160 is substantially uniform from end to end.

According to some embodiments, the spring 160 has a width in the range of from about 3 mm to 10 mm. According to some embodiments, the width of the spring 160 is substantially uniform from end to end.

According to some embodiments, the length of the free leg 164 is in the range of from about 5 mm to 15 mm.

The spring 160 may be formed of any suitable material or materials. In some embodiments, the spring 160 is formed of metal. Suitable metal materials may include CuSn 0.15 alloy (bronze), CuSn6, Cu-ETP, oxygen free copper, for example. According to some embodiments, the spring 160 has a restoring force in the ready position (FIG. 7) in the range of from about 0.5 N to 5 N. In some embodiments, the spring 160 is formed of a material (e.g., a metal) having a softening temperature greater than 300° C. In some embodiments, the spring 160 is unitary and, in some embodiments, the spring 160 is monolithic. In some embodiments, the spring 160 is formed (e.g., cut and bent) from sheet metal. In some embodiments, the spring 160 is formed of a different material than the spring 150.

According to some embodiments, the spring 160 has an electrical conductivity of at least 14 nΩ·m (at 20° C.).

The second electrical contact member 168 (FIG. 6) includes a base 168A and an integral U-shaped module terminal connector 168B. The springs 150 and 160 are secured to the base 168A (e.g., by rivets). The springs 150, 160 and the base 168A thus assembled collectively form a spring/contact subassembly.

The contact member 168 may be formed of any suitable material or materials. In some embodiments, the contact member 168 is formed of metal. Suitable metal materials may include nickel brass, CuSn 0.15, CuSN 6, CuP 0.008, for example. In some embodiments, the contact member 168 is unitary and, in some embodiments, is monolithic.

The solder 159 may be formed of any suitable material or materials. In some embodiments, the solder 159 is formed of metal. Suitable metal materials may include 58Bi42Sn for example.

According to some embodiments, the solder 159 is selected such that its melting point is greater than a prescribed maximum standard operating temperature, but less than or equal to a prescribed disconnect temperature. The maximum standard operating temperature may be the greatest temperature expected in the solder 159 during normal operation (including handling overvoltage surges within the designed for range of the module 100). The prescribed disconnect temperature is the temperature of the solder 159 at with the solder 159 is intended to release the spring 150 in order to actuate the first fail-safe mechanism 102.

According to some embodiments, the solder 159 has a melting point in the range of from about 109° C. to 160° C. and, in some embodiments, in the range of from about 85° C. to 200° C.

According to some embodiments, the solder 159 has an electrical conductivity in the range of from about 100 Siemens/meter (S/m) to 200 S/m and, according to some embodiments, in the range of from about 50 S/m to 500 S/m.

According to some embodiments, the layer of solder 159 has a thickness in the range of from about 0.05 mm to 0.5 mm. According to some embodiments, the thickness of the solder 159 is substantially uniform from end to end.

According to some embodiments, the layer of solder 159 has area in the range of from about 25 mm² to 45 mm². According to some embodiments, the layer of solder 159 covers at least about 85 percent of the overlap area between the terminal tab 137 and the contact portion 154B.

The indicator mechanism 170 includes a swing arm 172, an indicator shuttle or member 174, and an indicator spring 176. The swing arm 172 includes a pivot bore 172A from which a trigger leg 172B, an indicator leg 172C, and a switch leg 172D radially extend. An integral spring anchor post 172E is provided on the switch leg 172D.

A post 172F on the indicator leg 172C couples the indicator member 174 to the leg 172C. The indicator member 174 includes an indicator surface 174A. The indicator member 174 is slidably secured to the rail or frame front wall 116B to slide along an indicator axis I-I (FIG. 7).

The indicator spring 176 is secured at either end to the anchor post 172E and the anchor post 126A, and is elastically stretched so that it exerts a persistent pull force on the switch leg 172D.

The swing arm 172 and the indicator member 174 may be formed of any suitable material or materials. In some embodiments, the components 172, 174 are formed of a rigid polymeric material. Suitable polymeric materials may include polyamide (PA), polypropylene (PP), polyphenylene sulfide (PPS), or ABS, for example.

Figure 6:
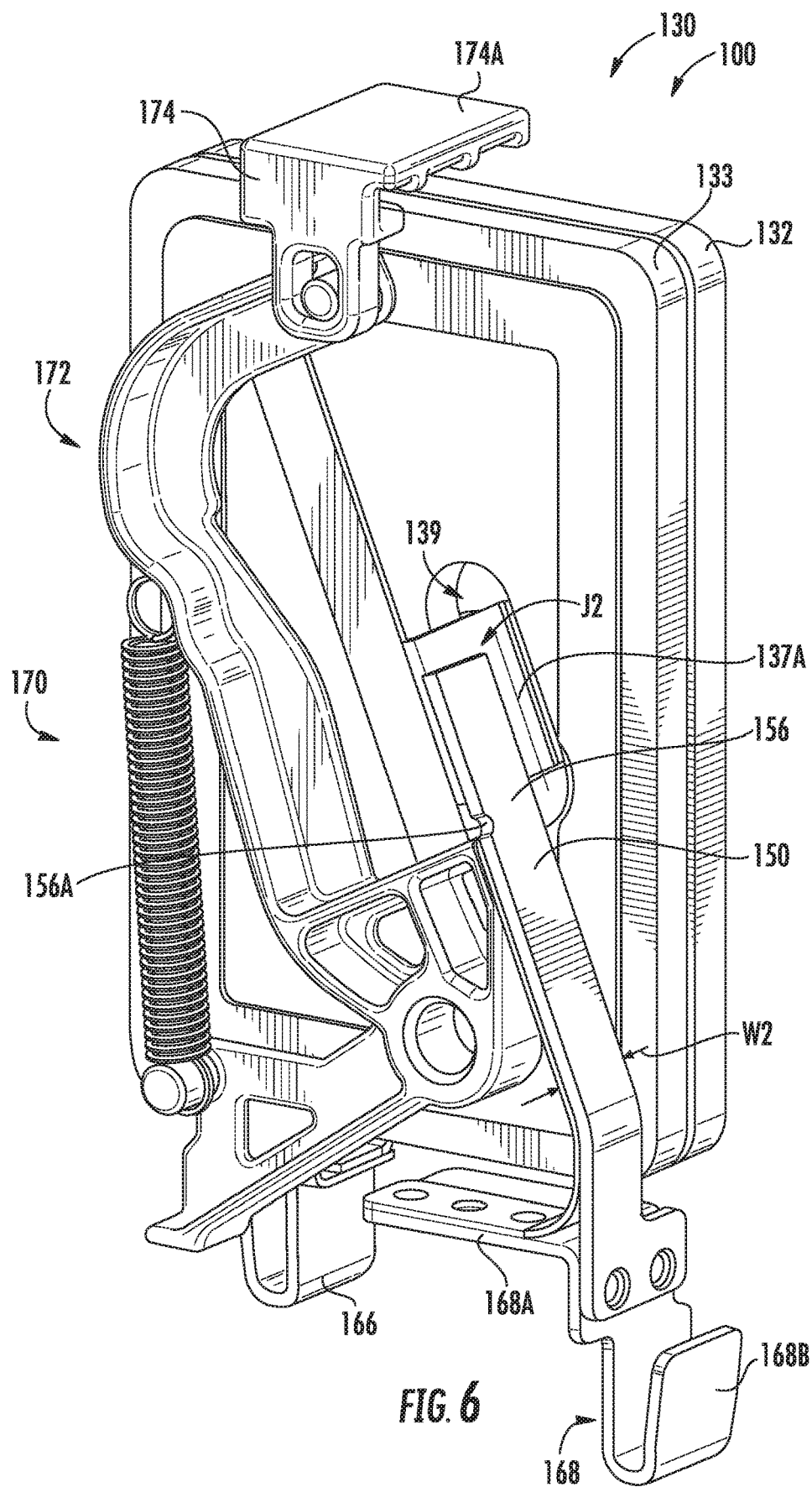
FIG. 6 is a fragmentary, front, right side perspective view of the SPD module of FIG. 2.
Figure 7:
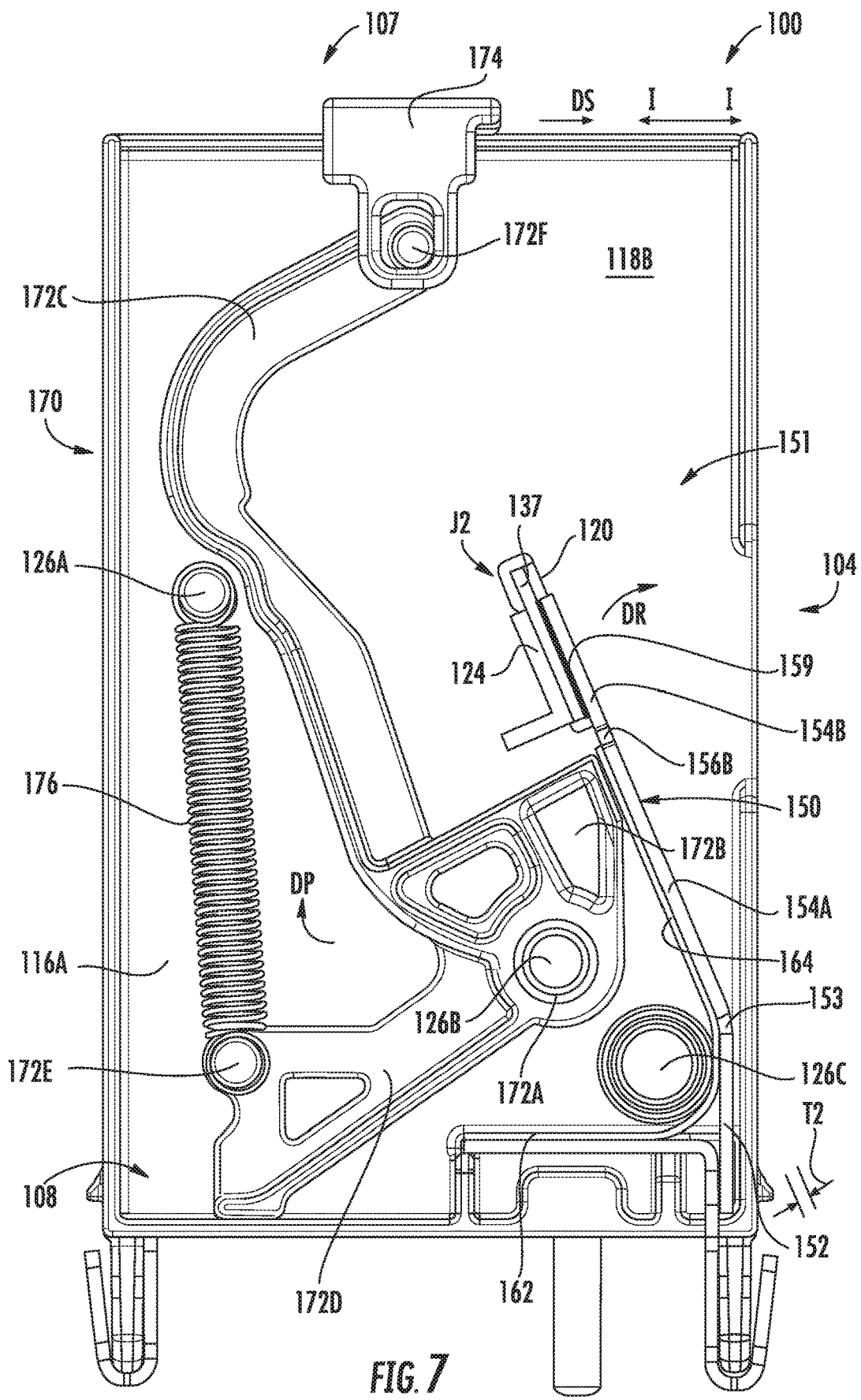
FIG. 7 is a right side view of the SPD module of FIG. 2 with the cover removed and a thermal disconnector mechanism thereof in a ready configuration.

When the module 100 is assembled in the ready configuration as shown in FIGS. 6 and 7, the disconnect spring 150 is elastically bent, deformed or deflected so that it persistently exerts a biasing load on the solder 159 pulling away from the terminal tab 137 in a release direction DR. The supplemental spring 160 is likewise elastically bent, deformed or deflected so that it persistently exerts a biasing load against the disconnect spring 150 in the release direction DR.

In the ready configuration, the swing arm 172 is locked in the position shown in FIG. 7 by the disconnect spring 150. The indicator spring 176 is elastically extended or stretched so that it persistently exerts a biasing load pulling the leg 172D in a pivot direction DP (i.e., toward the front wall 116B). The indicator member 174 is thereby secured in the ready position wherein the indicator surface 174A is not aligned with and visible through the window 112B.

Figure 13:
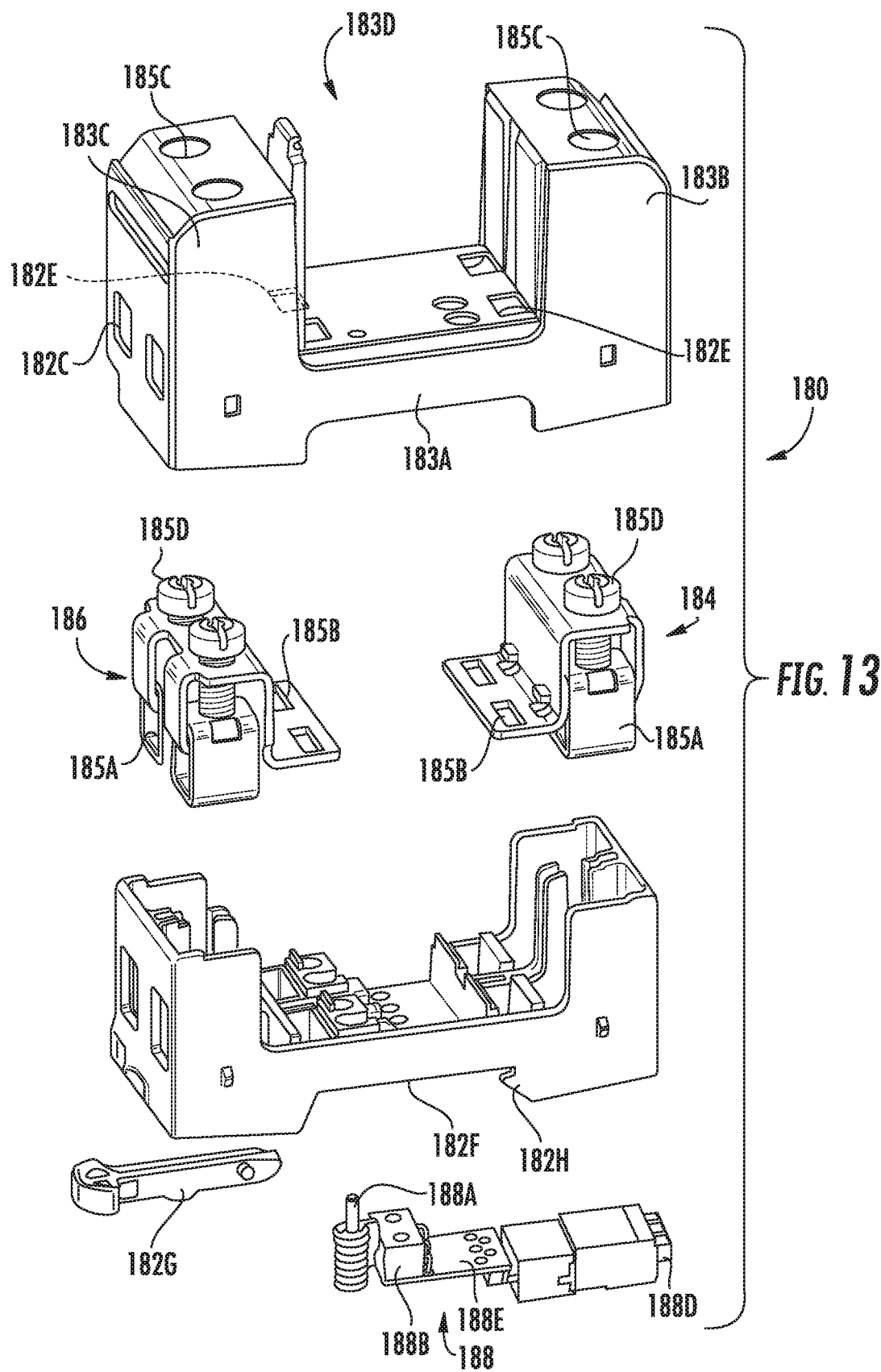
FIG. 13 is an exploded, perspective view of a base assembly forming a part of the SPD assembly of FIG. 1.
Figure 14:
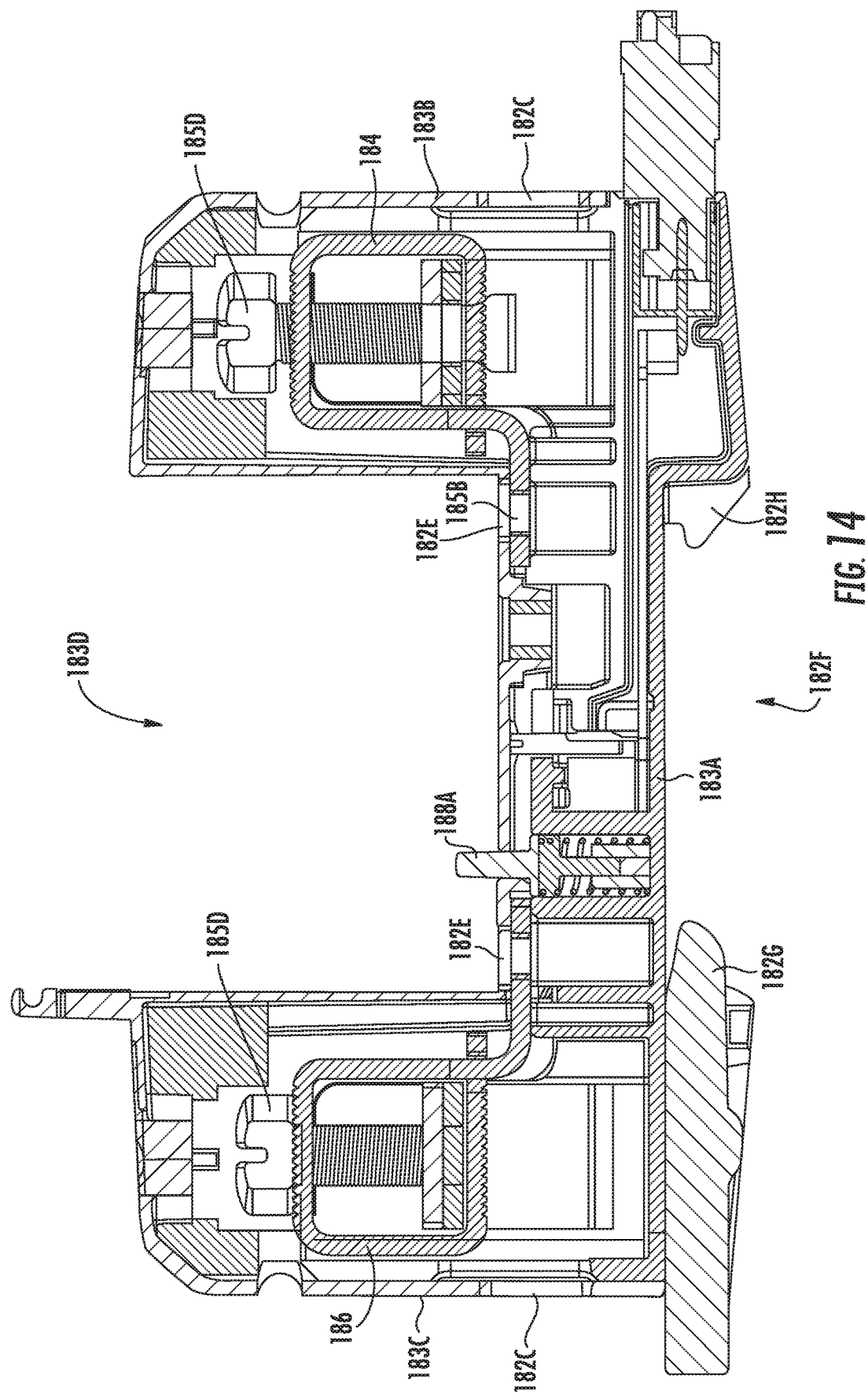
FIG. 14 is a cross-sectional view of the base assembly of FIG. 13.
Figure 15:
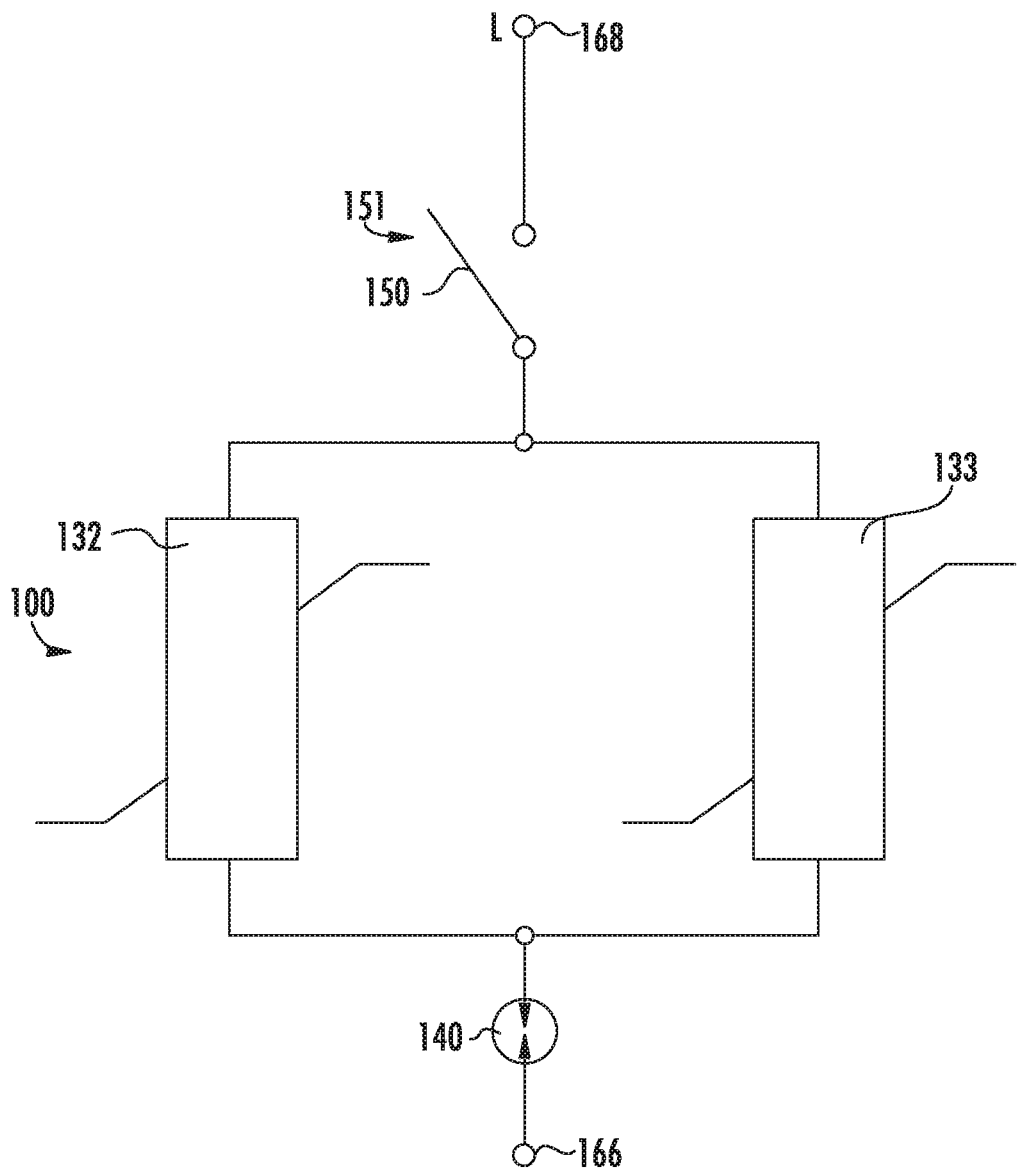
FIG. 15 is a schematic electrical circuit diagram of an electrical circuit formed by the SPD assembly of FIG. 1.

The electrical circuit formed by the module 100 is schematically represented in FIG. 13.

The system 101 may be used as follows in accordance with methods of the present invention.

Figure 16:
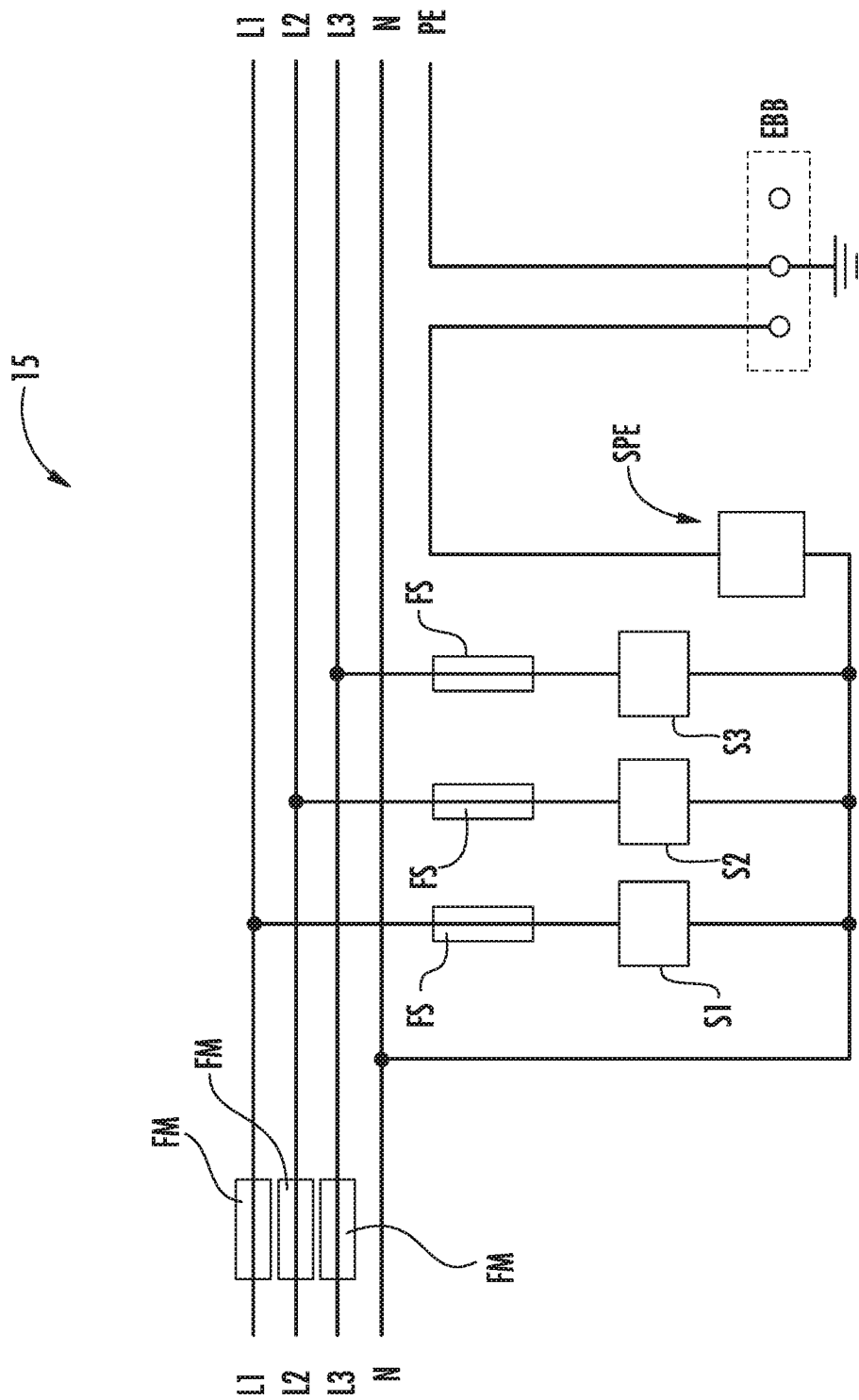
FIG. 16 is a schematic electrical circuit diagram of an electrical circuit including the SPD assembly of FIG. 1.

With reference to FIG. 16, an exemplary electrical circuit 15 in which one or more SPD assemblies 101 may be used is shown therein. The SPD assemblies 101 may be mounted on a DIN rail 10 (FIG. 1). The illustrated circuit 15 is a three phase system using a "3+1" protection configuration. In the illustrated circuit 15, there are three SPD assemblies 101 (designated S1, S2, S3, respectively) each connected between a respective line L1, L2, L3 and N (i.e., L-N). An additional SPD module SPE is connected between N and PE (i.e., N-PE). The SPD module SPE may be connected to PE through a local ground terminal EBB (e.g., an equipotential bonding bus bar). The SPD module SPE may also be an SPD assembly 101 as described herein. Each line L1, L2, L3 may be provided with a main circuit breaker or fuse FM and an external disconnector such as a supplemental fuse FS between the line and its SPD assembly S1, S2, S3. In other embodiments, one or more of the SPD assemblies S1, S2, S3, SPE may be of a different construction than the SPD assembly 101 as disclosed herein.

Operation of the SPD assembly S1 and conditions or transient overvoltage events on the line L1 will be described hereinbelow. However, it will be appreciated that this description likewise applies to the SPD assemblies S2, S3 and the lines L2, L3.

In case of a failure of the varistor 132 or 133, a fault current will be conducted between the corresponding line (e.g., Line L1 of FIG. 16) and the neutral line N. As is well known, a varistor has an innate nominal clamping voltage VNOM (sometimes referred to as the "breakdown voltage" or simply the "varistor voltage") at which the varistor begins to conduct current. Below the VNOM, the varistor will conduct practically no current. Above the VNOM, the varistor will conduct a current (i.e., a leakage current or a surge current). The VNOM of a varistor is typically specified as the measured voltage across the varistor with a DC current of 1 mA.

As is well known, a varistor has three modes of operation. In a first normal mode (discussed above), up to a nominal voltage, the varistor is practically an electrical insulator. In a second normal mode (also discussed above), when the varistor is subjected to an overvoltage, the varistor temporarily and reversibly becomes an electrical conductor during the overvoltage condition and returns to the first mode thereafter. In a third mode (the so-called end of life mode), the varistor is effectively depleted and becomes a permanent, non-reversible electrical conductor.

The varistor also has an innate clamping voltage VC (sometimes referred to as simply the "clamping voltage"). The clamping voltage VC is defined as the maximum voltage measured across the varistor when a specified current is applied to the varistor over time according to a standard protocol.

In the absence of an overvoltage condition, the varistors 132, 133 provide high resistance such that approximately no current flows through the module 100 as it appears electrically as an open circuit. That is, ordinarily each varistor passes approximately no current. In the event of an overcurrent surge event (typically transient; e.g., lightning strike) or an overvoltage condition or event (typically longer in duration than an overcurrent surge event) exceeding VNOM, the resistance of the varistor wafer decreases rapidly, allowing current to flow through the module 100 and create a shunt path for current flow to protect other components of an associated electrical system. Normally, the varistor recovers from these events without significant overheating of the module 100.

Varistors have multiple failure modes. The failure modes include: 1) the varistor fails as a short circuit; and 2) the varistor fails as a linear resistance. The failure of the varistor to a short circuit or to a linear resistance may be caused by the conduction of a single or multiple surge currents of sufficient magnitude and duration or by a single or multiple continuous overvoltage events that will drive a sufficient current through the varistor.

A short circuit failure typically manifests as a localized pinhole or puncture site (herein, "the failure site") extending through the thickness of the varistor. This failure site creates a path for current flow between the two electrodes of a low resistance, but high enough to generate ohmic losses and cause overheating of the device even at low fault currents. Sufficiently large fault current through the varistor can melt the varistor in the region of the failure site and generate an electric arc.

A varistor failure as a linear resistance will cause the conduction of a limited current through the varistor that will result in a buildup of heat. This heat buildup may result in catastrophic thermal runaway and the device temperature may exceed a prescribed maximum temperature. For example, the maximum allowable temperature for the exterior surfaces of the device may be set by code or standard to prevent combustion of adjacent components. If the leakage current is not interrupted at a certain period of time, the overheating will result eventually in the failure of the varistor to a short circuit as defined above.

In some cases, the current through the failed varistor could also be limited by the power system itself (e.g., ground resistance in the system or in photo-voltaic (PV) power source applications where the fault current depends on the power generation capability of the system at the time of the failure) resulting in a progressive build up of temperature, even if the varistor failure is a short circuit. There are cases where there is a limited leakage current flow through the varistor due to extended in time overvoltage conditions due to power system failures, for example. These conditions may lead to temperature build up in the device, such as when the varistor has failed as a linear resistance and could possibly lead to the failure of the varistor either as a linear resistance or as a short circuit as described above.

As discussed above, in some cases the module 100 may assume an "end of life" mode in which one or both of the varistors 132, 133 is depleted in full or in part (i.e., in an "end of life" state), leading to an end of life failure. When the varistor reaches its end of life, the module 100 will become substantially a short circuit with a very low but non-zero ohmic resistance. As a result, in an end of life condition, a fault current will continuously flow through the varistor even in the absence of an overvoltage condition.

In use, the base 180 is mounted on the DIN rail 10 as shown in FIG. 1. The DIN rail 10 is received in the channel 182F and secured by the hooks 182H and the latch mechanism 182G.

Cables 20, 22 (shown in dashed line in FIG. 1) are inserted through the cable ports 182C and secured in the clamp connectors 185A. In some embodiments, the cable 20 is connected to the line L1 and the cable 22 is connected to Protective Earth (PE).

The module 100 is then axially plugged or inserted into the receiver slot 183D in an insertion direction along the axis A-A through the front opening. The module 100 is pushed back into the receiver slot 183D until the rear end of the module 100 substantially engages the front side of the rear housing section 183A, as shown in FIG. 1.

Insertion of the module 100 into the slot 183D causes the terminals 166B and 168B to be inserted into the sockets 184B and 186B along an insertion axis I-I.

Because the thermal disconnector mechanism 151 is in its ready position, the indicator member 174 is held in a retracted position (FIGS. 6 and 7). Additionally, when the module 100 is inserted into the receiver slot 183D, the remote control pin 188A is thereby inserted into and extends through the port 122 but is depressed by the end 172G of the leg 172D that covers the port 122. The module 100 thereby provides feedback through the depressed remote control pin 188A that the module 100 has been seated in the base 180 and the module 100 is in its ready or operational (non-failed) condition.

The module 100 can be released and removed from the base 180 by executing a reverse of the foregoing procedure. The foregoing steps of mounting and removing the module 100 or other suitably configured modules in and from base 180 can be repeated multiple times. For example, in the event that the varistor 132 of the module 100 is degraded or destroyed or no longer of proper specification for the intended application, the module 100 can be replaced with a fresh or suitably constructed module.

The SPD assembly 101 has several modes of operation depending on the states of the varistors 132, 133 and external event conditions.

In some modes, the first fail-safe mechanism 102 operates by heating the solder 159 until the solder melts and permits the elastic spring loads of the springs 150, 160 to cause the contact portion 154B to pull away from the terminal tab 137 and thereby out of electrical continuity with the electrode 136. The varistors 132, 133 are thereby electrically disconnected from the contact member 168, creating an open circuit between the terminals 166B, 168B.

In some modes, the second fail-safe mechanism 104 operates by heating the spring 150 at the weak region 156 until the weak region is sufficiently heat-softened to permit the loads of the springs 150, 160 to cause the spring 150 to break at the weak region 156. The contact portion 154B may remain bonded to the terminal tab 137 by the solder 159, but the lower portion 154A pulls away from contact portion 154B and thereby out of electrical continuity with the electrode 136. The varistors 132, 133 are thereby electrically disconnected from the contact member 168, creating an open circuit between the terminals 166B, 168B.

During normal operation (referred to herein as Mode 1), the module 100 operates as an open circuit between the neutral cable 20 and the PE cable 22. The thermal disconnector mechanism 151 remains in a ready position (FIGS. 6 and 7), with the contact portion 154B of the disconnect spring 150 bonded to and in electrical continuity with the terminal tab 137 by the solder 159. In this normal mode, each varistor 132, 133 is an insulator up to the nominal clamping voltage VNOM (and therefore the SPD module 100 is an insulator as well). In this mode, the fail-safe mechanisms 102, 104 are not actuated (i.e., the thermal disconnector 151 remains in the ready position (FIGS. 6 and 7)).

In the event of a transient overvoltage or surge current in, the line L1, protection of power system load devices may necessitate providing a current path to ground for the excess current of the surge current. The surge current may generate a transient overvoltage between the line cable 20 and the PE cable 22, which may overcome the isolation of the GDT 140 and one or both of the varistors 132, 133. In this event and mode (referred to herein as Mode 2), the varistor(s) 132, 133 is (are) subjected to an overvoltage exceeding VNOM, and temporarily and reversibly becomes a low resistance electrical conductor. Similarly, the GDT 140 is subjected to a transient overvoltage exceeding its break down voltage, and temporarily and reversibly becomes a low resistance electrical conductor. The GDT 140 and varistors 132, 133 will then divert, shunt or allow the high surge current or impulse current to flow from the line cable 20, through the base connector 184, through the contact member 168, through the springs 150, 160, through the solder 159, through the terminal tab 137, through the electrode 136, through the varistors 132, 133, through the electrodes 134, 138, through the GDT 140, through the GDT electrode 142, through the contact member 166, and through the base connector 186 and to the protective earth cable 22 for a short duration.

In Mode 2, the fail-safe mechanism 102 does not operate because the overvoltage event is short in duration and the heat generated by the surge current is insufficient to melt the solder 159.

In Mode 2, the fail-safe mechanism 104 does not operate because the heat generated in the spring 150 is not sufficient to weaken the weak region 156 to the point of breaking.

If the surge or impulse current is below the maximum surge/impulse current that the SPD module 100 is rated for, the external fuse FS will not blow and the varistors 132, 133 should remain functional. In this case, because the fail-safe mechanisms 102, 104 are not tripped, the SPD module 100 can remain in place for future overvoltage events.

If the surge or impulse current exceeds the maximum surge/impulse current that the SPD module 100 is rated for, the fuse FS will typically blow or be tripped. The varistors 132, 133 may also fail internally as a short (with pinhole) or with limited resistance. In such cases, the mode of operations will be a failure mode as described below for Modes 3, 4 or 5.

In a third mode (Mode 3), the varistor 132 is in end of life mode with a low leakage current between the lines L1 and PE. Alternatively or additionally, the varistor 133 may be in end of life mode, in which case the behavior described below likewise applies to the varistor 133. The varistor 132 fails as a linear resistance. This type of varistor failure could be the result of multiple surge/impulse currents. The leakage current generates heat in the varistor 132 from ohmic losses. In some cases, the leakage current occurs during normal operation and is low (from about 0 to 0.5 A). The heat generated in the varistor 132 progressively deteriorates the varistor 132 and builds up over an extended duration.

Figure 8:
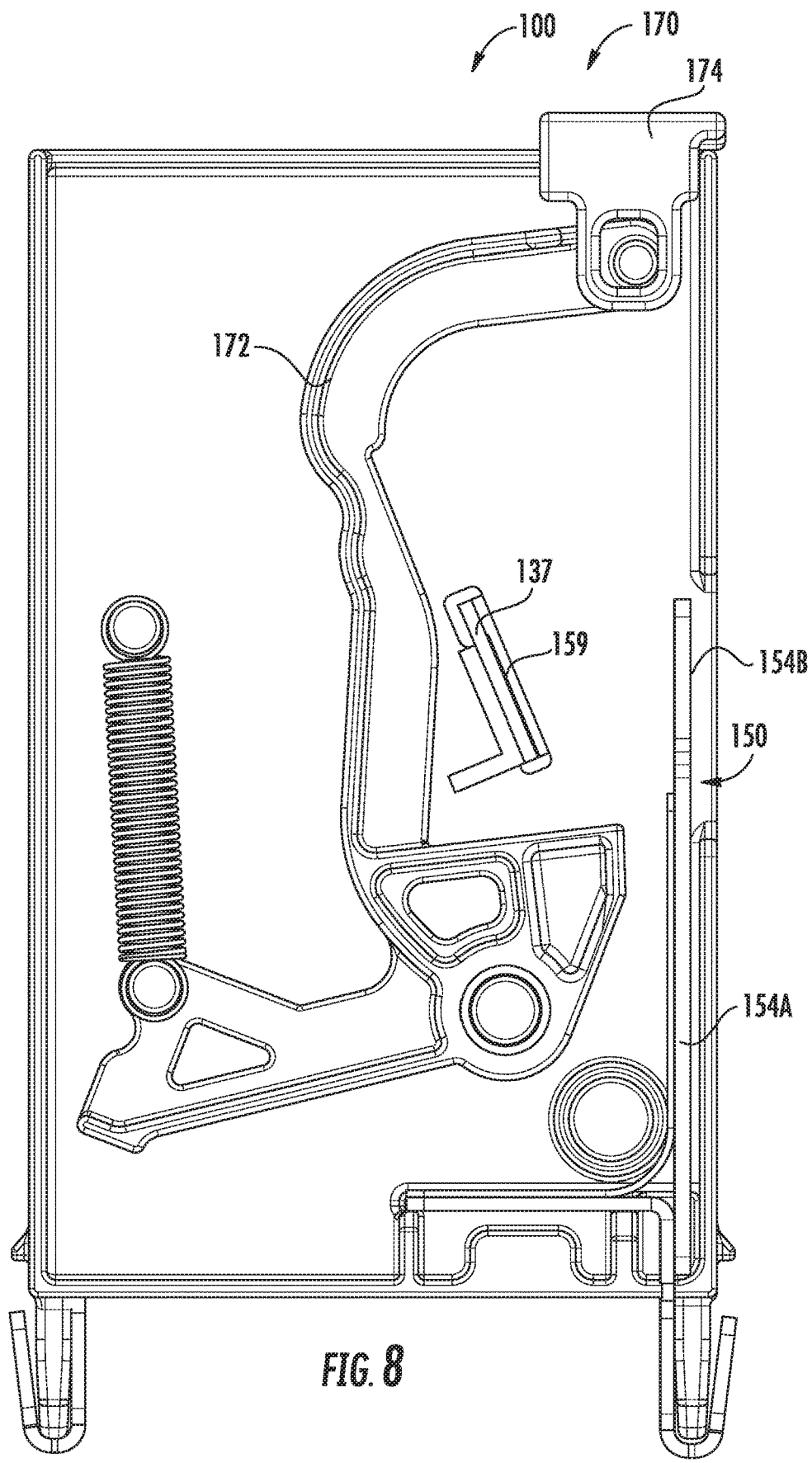
FIG. 8 is a right side view of the SPD module of FIG. 2 with the cover removed and the thermal disconnector mechanism thereof in a first tripped configuration.

In Mode 3, the fail-safe mechanism 102 operates. More particularly, the heat (e.g., from ohmic losses in the varistor 132) is transferred from the varistor 132 to the electrode 136, and then to the solder 159. Over an extended time period (e.g., in the range of from about 60 seconds to 48 hours), the heat builds up in the solder 159 until the solder 159 melts. The melted solder 159 releases the spring 150 into an open or released configuration to open the circuit in the SPD module 100 as shown in FIG. 8. The varistors 132, 133 is thereby prevented from catastrophically overheating.

In Mode 3, the fail-safe mechanism 104 does not operate because the heat generated in the spring 150 is not sufficient to weaken the weak region 156 to the point of breaking.

In Mode 3, the SPD module 100 must be replaced because the fail-safe mechanism 102 has been tripped.

In a fourth mode (Mode 4), the varistor 132 is in good condition (i.e., not in end of life condition), but there is a Temporary Overvoltage (TOV) event wherein the voltage across the terminals 166B, 168B forces the varistor 132 to conduct an increased leakage current (typically, in the range of from about 0 to 10 A). This leakage current builds up heat over a duration (e.g., in the range of from about 5 seconds to 120 minutes) that is shorter than the duration of the leakage current that triggers the fail-safe mechanism 102 in Mode 3, but far longer than the impulse current that is conducted by the varistor 132 in Mode 2. Again, this phenomenon may occur in the varistor 133 in place of or in addition to the varistor 132.

In Mode 4, the fail-safe mechanism 102 is tripped (i.e., the spring 150 is released by the solder 159) to open the circuit through the SPD module 100 as shown in FIG. 8 in the same manner as described for Mode 3.

In Mode 4, the fail-safe mechanism 104 does not operate because the heat generated in the spring 150 is not sufficient to weaken the weak region 156 to the point of breaking.

In Mode 4, the SPD module 100 must be replaced because the fail-safe mechanism 102 has been tripped.

In a fifth mode (Mode 5), the varistor 132 (and/or the varistor 133) is in end of life mode as a short circuit or a linear resistance that allows current from the power source to be conducted therethrough. The value of the conducted current could be between about 10 Amps and the maximum short circuit current of the power source (which should be lower than the short circuit current rating of the SPD module 100). This depends on the specific configuration of the electrical installation and the severity of the varistor failure.

For Mode 5, there are two mechanisms operating to protect the SPD module 100: namely, the external fuse FS and the fail-safe mechanism 104 as described above. The fail-safe mechanism 104 is triggered for current levels between 10 Amps and intermediate current levels (typically five times the rating of the external fuse FS). For higher current levels, the external fuse FS will trip first to protect the SPD 100. For example, an SPD 100 could be protected by the fail-safe mechanism 104 for current levels up to 1000 A and with a 200 A external fuse FS for current levels up to 25 kA.

In Mode 5, for intermediate currents, the current level is not high enough to trip the external fuse FS within a reasonable amount of time (e.g., in the range of from about 50 ms to 5000 ms). Further, the fail-safe mechanism 102 is too slow and cannot protect the SPD module 100. By the time the fail-safe mechanism 102 trips, there would be significant internal damage to the SPD module 100.

Figure 9:
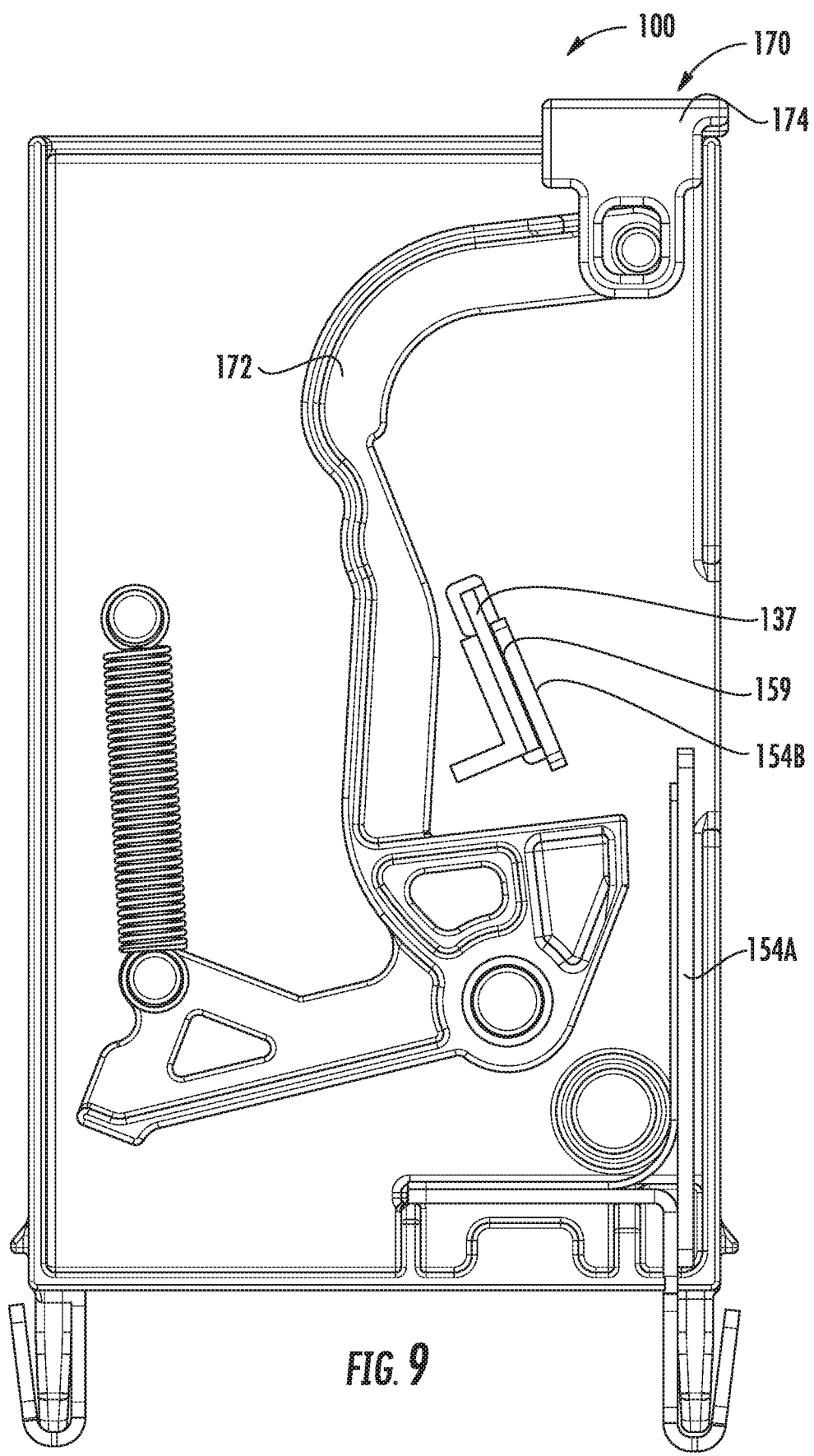
FIG. 9 is a right side view of the SPD module of FIG. 2 with the cover removed and the thermal disconnector mechanism thereof in a second tripped configuration.
Figure 10:
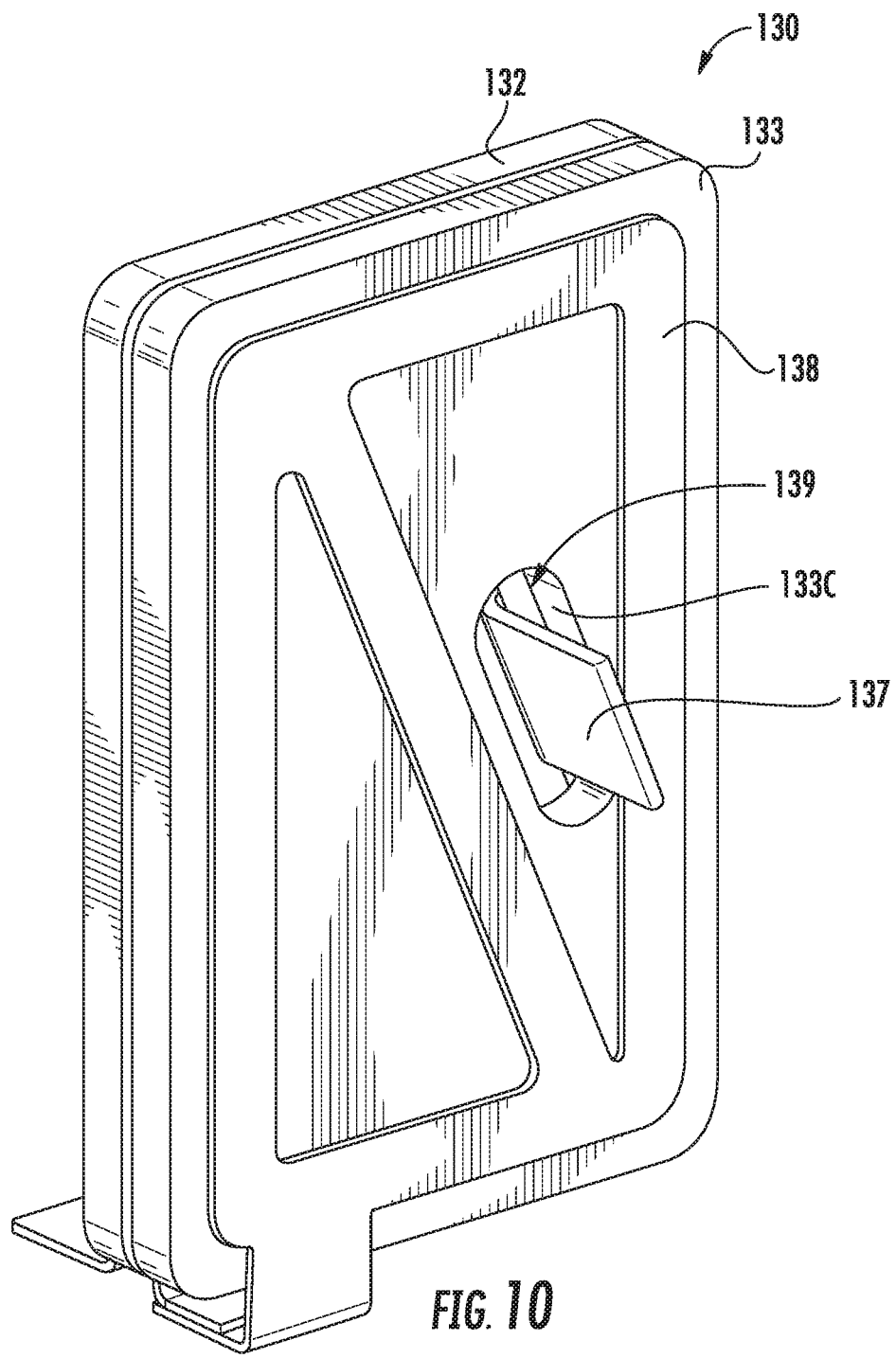
FIG. 10 is a front, right side perspective view of an overvoltage clamping element assembly forming a part of the SPD module of FIG. 2.

Therefore, in Mode 5, the fail-safe mechanism 104 is tripped to open the circuit through the SPD module 100 as shown in FIG. 9. More particularly, the current heats the spring 150 at the weak region 156 until the loads of the springs 150, 160 cause the spring 150 to break at the weak region 156 and produce the necessary distance between the electrodes for extinguishing the associated arc. The spring 150 will disproportionately heat and weaken at the weak region 156 because the electrically conductive cross-sectional area at the weak region 156 is less than that of the remainder of the spring 150, because the electrically conductive cross-sectional area of the remainder of the spring 150 is effectively supplemented by the supplemental spring 160, and because the remainder of the spring 156 is cooled by the supplemental spring 160. The varistor 132 is thereby electrically disconnected from the contact member 168, creating an open circuit between the terminals 166B, 168B. Only the fail-safe mechanism 104 operates in time and disconnects the SPD 100 before any internal damage takes place.

Alternatively, a lower rated fuse FS could be used so that the fuse FS will trip much faster and protect the SPD 100 even at intermediate current levels. For example, a 10A fuse FS could be used and the fail-safe mechanism 104 could be omitted. But then, such a lower rated fuse FS would trip at surge/impulse currents below the level that the SPD 100 could actually withstand. Therefore, by using the fail-safe mechanism 104, the performance of the SPD 100 is extended in surge/impulse currents.

The release of the disconnect spring 150 as described above (by actuation of the fail-safe mechanism 102 or the fail-safe mechanism 104) also actuates a local alert mechanism 107. The displacement of the springs 150, 160 in the release direction DR frees the swing arm leg 172B from the springs 150, 160. The swing arm 172 is driven in a pivot direction DP (FIG. 7) by the spring 176 from the locked position (FIGS. 6 and 7) to an indicating position (FIGS. 8 and 9). The indicator member 174 is thereby driven by the spring 176 to slide along the rail 116B in a signaling direction DS (FIG. 7). The indicator member 174 is thereby displaced to an alert position as shown in FIGS. 8 and 9 wherein the indicator surface 174A is aligned with and visible through the front window 112B of the module housing 110. The indicator surface 174A has a noticeably different visual appearance through the front window 112B than the housing indicator surface 116C, providing a visual alert or indication so that an operator can readily determine that the local alert mechanism 107 has been activated. For example, the housing indicator surface 116C and the indicator surface 174A may have distinctly different colors (e.g., green versus red). In this manner, the local alert mechanism 107 can provide a convenient indication that the module 100 has assumed its open circuit configuration or state.

The release of the swing arm 172 as described above also actuates a remote alert mechanism 108. In the ready position of the module 100, an end 172G of the switch leg 172D covers the rear opening 122 so that the switch pin 188A of the base 180 is maintained compressed. When the swing arm 172 pivots into the indicating position, the switch leg 172D moves away from the rear opening 122 so that the rear port 122 is no longer covered. The switch pin 188A is thereby permitted to extend further into the module 100 through the opening 122 to an alert signal position. The remote pin 188A is connected to the switch electronics 188B or sensor, which detects the displacement of the pin 188A and provides an electrical signal to a remote device or terminal via the connector 188D. In this manner, the remote alert mechanism 108 can provide a convenient remote indication that the module 100 has assumed its open circuit configuration or state.

As discussed above, the thermal disconnector mechanism 151 is responsive to temperature rise in the SPD module 100 when current flows through the varistor 132, and disconnects the varistor 132 from the power line. In general, the thermal disconnector mechanism 151 may be configured to desirably balance the response of the SPD assembly 100 and the fuse FS to impulse or surge currents versus leakage currents. The failure mode of the varistor 132 or 133 could be one of the modes discussed above, for example: progressive deterioration of the varistor 132 that will result in increased leakage current at normal operation (e.g., 0-0.5 A); temporary overvoltage (TOV) events that will result in an increased conduction of leakage current (e.g., 0.5 A-10 A); or a short circuit of the varistor 132 or 133 that may result in a significant current conduction (a few amps up to the full prospective short circuit current of the power line, e.g., up to 200 kArms).

When the varistor 132, 133 has an increased leakage current conduction (Modes 3 and 4 discussed above), then the varistor 132, 133 will progressively overheat over an extended period of time. Eventually, the thermal disconnector mechanism 151 will then react to the temperature rise of the varistor 132, 133 that is transferred to the soldering joint J2 through the electrode tab 137. How fast the thermal disconnector mechanism 151 will react to this event on a given temperature profile of the varistor 132 depends on the materials of the components of the thermal disconnector mechanism 151 and the melting point of the solder 159. These parameters can be selected to tune the response of the thermal disconnector mechanism 151 to different event profiles or types of events.

Further, the reaction time of the thermal disconnector mechanism 151 should not be too fast, because in cases where the varistor 132, 133 conducts surge currents of increased energy, the varistor 132, 133 will overheat and the disconnector mechanism 151 might trip, even though the varistor 132, 133 is intact. Therefore, it is desirable or necessary to fine tune the reaction time of the thermal disconnector mechanism 151. Therefore, the selection of the material and shape of the elements that constitute the thermal disconnector mechanism 151 are important, and may be critical, for proper operation during all kinds of events/exposures the SPD module 100 might face, as the reaction time depends on this selection.

During sudden failure of the varistor 132, 133 to a short circuit, the current through the varistor 132, 133 could reach from intermediate values (a few kA) up to the maximum short circuit current of the power line. For intermediate values of current, typically the weak point 156 of the thermal disconnector will overheat first, melt and disconnect the current via the second fail-safe mechanism 104. This is done because the weak point 156 of the thermal disconnector mechanism 151 has a decreased cross section area of higher resistance. Also the selection of the material of the weak region 156 is important for its fast reaction time, as in such events the second fail-safe mechanism 104 of the thermal disconnector mechanism 151 must react very fast. The second fail-safe mechanism 104 is not responsive to surge currents, so there is no low limit for its response time. In addition, if the second fail-safe mechanism 104 does not react fast enough, the SPD module 100 may be damaged due to the high current conducted. Further, during these events there will be no melting of the solder 159, as the first fail-safe mechanism 102 takes a relatively long time to react (seconds), while the second fail-safe mechanism 104 executes more quickly and the weak point 156 will melt in milliseconds (ms).

When the short circuit current is high enough, then the SPD module 100 is protected by an external fuse FS. In general, the external fuse FS will trip when the short circuit current is sufficient to trip when the fuse FS. The thermal disconnector mechanism 151 (either the first fail-safe mechanism 102 or the second fail-safe mechanism 104) will trip when the short circuit current is insufficient to trip the fuse FS.

The SPD system 103 and the SPD module 100 can provide a number of advantages. The configuration of the overvoltage clamping element assembly 130 and, in particular, the routing of the electrode terminal 137 through the hole 139 in the varistor 133, allows for a more compact total width of the final assembly.

The routing of the electrode terminal 137 through the hole 139 also moves the heat sources (i.e., the varistors 132, 133) closer to the disconnection points (i.e., the solder joint J2 and the spring weak region 156), resulting in a safer and quicker thermally triggered disconnection when needed.

The SPD module 100 can meet higher maximum rated impulse current requirements at the same voltage levels because the available varistor surface area (i.e., of the varistors 132, 133) is doubled by the provision of two varistors 132, 133 arranged in electrical parallel.

The provision of the GDT 140 in series with the varistors 132, 133 can provide a substantially leakage-free operation. In the absence of a surge current, the GDT 140 will remain non-electrically conducting, and will thereby prevent conduction of a leakage current through the varistors 132, 133. In the event of a surge, the varistors 132, 133 will clamp and conduct, permitting the GDT 140 to break over and conduct. When the surge subsides, the varistors 132, 133 will return to their high electrical insulating states, causing the arc of the GDT 140 to extinguish. In this manner, the varistors 132, 133 can terminate an extended follow current that may otherwise cause the GDT 140 to fail.

The potting P can provide strength and vibration resistance to the SPD module 100 and may be less expensive to use than epoxy. The potting P can provide thermal absorption to cool the varistors 132, 133 and the GDT 140.

The integral electrode tab reinforcement feature or post 124 mechanically supports or reinforces the electrode tab 137 and the spring contact portion 154B to resist deformation or deflection of these components that may jeopardize the solder joint J2. Absent the feature 124, such deformation or deflection may be induced by electrodynamic loads generated on the electrode 136 by surge currents.

The shapes of the electrodes 134, 136, 138 can provide good electrical contact between the electrodes 134, 136, 138 and the metallization layers while minimizing the required material. The electrodes 134, 136, 138 can accommodate and effectively cover and contact MOVs having a range of sizes (e.g., 75V to 880V). The diagonal cross-legs 134B, 136B, 138B can resist deformation or deflection in the electrodes 134, 136, 138 and the varistors 132, 133 induced by electrodynamic loads generated on the electrode 136 by surge currents. In particular, the cross-leg 136B can resist rotation or other relative displacement of the electrode tab 137.

The supplemental spring 160 serves as a heat sink element to provide cooling of the disconnect spring 150 when high current flows through the springs 150, 160. The spring 160 also increases the short circuit capability of the SPD module 100. The spring 160 provides additional deflection force on the spring 150 (and, thereby, the weak region 156 and the solder joint J2). Because the spring 160 terminates below the weak region 156, the spring 160 does not increase the effective cross-sectional area of the weak region 156.

Because the supplemental spring 160 is a discrete component separately formed from the disconnect spring 150, the springs 150 and 160 can each be formed of materials and dimensions best suited for their respective functions. Also, the SPD module 100 can be more cost-effectively manufactured.

In some embodiments, the springs 150, 160 together exert a spring force on the solder 159 in the range of from about 0.5 N to 1.5 N when the disconnect mechanism 151 is in the ready position.

In some embodiments, the module 100 is a Class I surge protective device (SPD). In some embodiments, the module 100 is compliant with IEC 61643-11 "Additional duty test for test Class I" for SPDs (Clause 8.3.4.4) based on the impulse discharge current waveform defined in Clause 8.1.1 of IEC 61643-11, typically referred to as 10/350 microsecond ("µs") current waveform ("10/350 µs current waveform"). The 10/350 µs current waveform may characterize a current wave in which the maximum current (100%) is reached at about 10 µs and the current is 50% of the maximum at about 350 µs. Under 10/350 µs current waveform, the transferred charge, Q, and specific energy, W/R, to SPDs should be related with peak current according to one or more standards. For example, the IEC 61643-11 parameters to Class I SPD test are illustrated in Table 1, which follows:

TABLE 1

Parameters for Class I SPD Test

| $I_{imp}$ within 50 µs (kA) | Q within 5 ms (As) | W/R within 5 ms (kJ/Ω) |
| --- | --- | --- |
| 25 | 12.5 | 156 |
| 20 | 10 | 100 |
| 12.5 | 6.25 | 39 |
| 10 | 5 | 25 |
| 5 | 2.5 | 6.25 |
| 2 | 1 | 1 |
| 1 | 0.5 | 0.25 |

It is desirable that the SPD modules have a small form factor. In particular, in some applications it is desirable that the SPD modules each have a size of 1 TE according to DIN Standard 43871, published Nov. 1, 1992. According to some embodiments, the module 100 has a maximum width W9 (FIG. 1) parallel to the axis F1-F1 of about 18 mm.

Modules including fail-safe mechanisms, alarm mechanisms and connector systems as disclosed herein may include an overvoltage clamping element of a different type in place of the varistor 132. The overvoltage clamping element may be a transient voltage suppressor (TVS) such as a TVS-diode (e.g., a silicon avalanche diode (SAD)).

As discussed above, in some embodiments the springs 150, 160 are formed of metal and, in some embodiments, are formed of CuSn 0.15. By using metal springs 150, 160, the reliability and, thus, safety of the SPD module 100 is improved because the module 100 does not rely on operation of a plastic part (which could melt or jam) to push the thermal disconnector mechanism 151 into the open position. A metal spring 150, 160 can maintain its spring force at a much higher temperature than a plastic spring. Moreover, a CuSn 0.15 spring can maintain its spring force or characteristics at a much higher temperature (e.g., up to 400° C.) than springs formed of other typical spring copper materials (e.g., Cu/ETP) that lose their spring characteristics at about 200° C.

Figure 17:
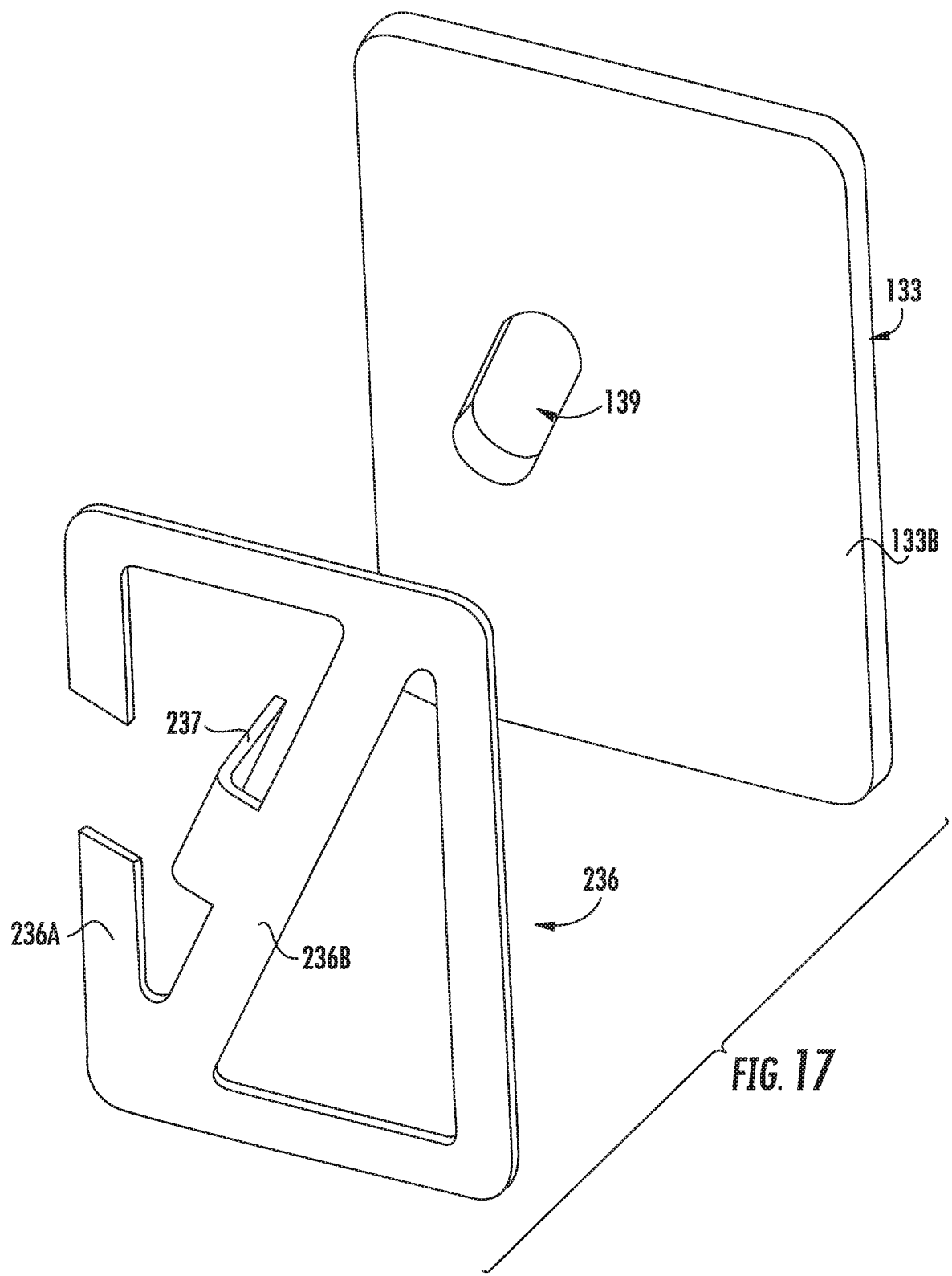
FIG. 17 is an exploded, fragmentary view of an overvoltage clamping element assembly according to further embodiments of the invention.

FIG. 17 shows an electrode 236 that may be used in place of the electrode 136 in accordance with further embodiments. The electrode 236 differs from the electrode 136 in that the integral terminal tab 237 extends from the cross-leg 236B instead of the perimeter portion 236A.

With reference to FIGS. 18-21, an SPD module 300 according to further embodiments of the invention is shown therein. The SPD module 300 includes a housing member 310, an overvoltage clamping element assembly 330, a thermal disconnector mechanism 351, a first electrical contact member 366, and a second electrical contact member 368. The SPD module 300 may further include potting corresponding to the potting P (FIG. 4) filling the housing member 310. The SPD module 300 may further include a housing cover member (not shown) corresponding to the housing cover member 112.

The assembly 330 includes a first varistor 332, a second varistor 333, a first electrode 334, a second electrode 336, a third electrode 338, a GDT 340, a GDT electrode 342, and contact members 366, 368 corresponding to and constructed and assembled in the same manner as the components 132, 133, 134, 136, 138, 140, 142, 166 and 168, respectively, except as discussed herein.

The second electrode 336 is configured as a flat plate and the integral terminal tab 137 is not provided. The second varistor 333 is provided with a through hole 339 corresponding to the hole 139. The hole 339 may be of a different shape and placement than the hole 139.

The thermal disconnector mechanism 351 includes an electrically conductive electrical conductor, contact member or disconnect spring 350. The disconnect spring 350 may be formed of a material as described above for the disconnect spring 150. The disconnect spring 350 includes a base leg 352 (affixed to the contact member 368) and a free leg 354. The free leg 354 includes a proximal or lower portion 354A and a distal or upper contact portion 354B. The contact portion 354B is joined to the lower portion 354A by an integral bridge portion 354C that passes through the hole 339. The contact portion 354B is releasably secured to the second electrode 336 by a layer of solder 359 corresponding to the solder 159. In some embodiments, the solder 359 directly engages each of the electrode 336 and the contact portion 354B.

Figure 18:
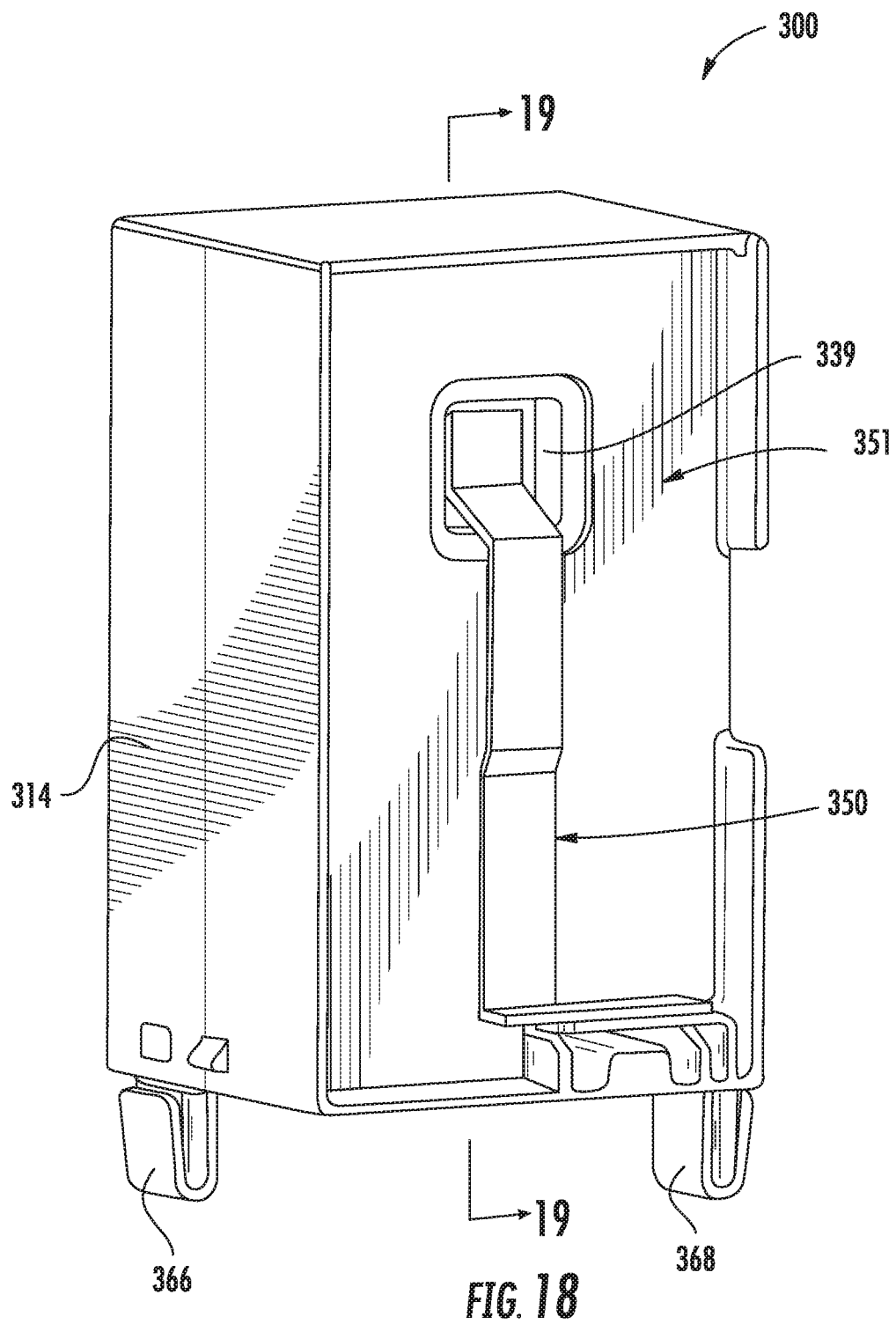
FIG. 18 is a perspective view of an SPD module according to further embodiments of the invention.
Figure 19:
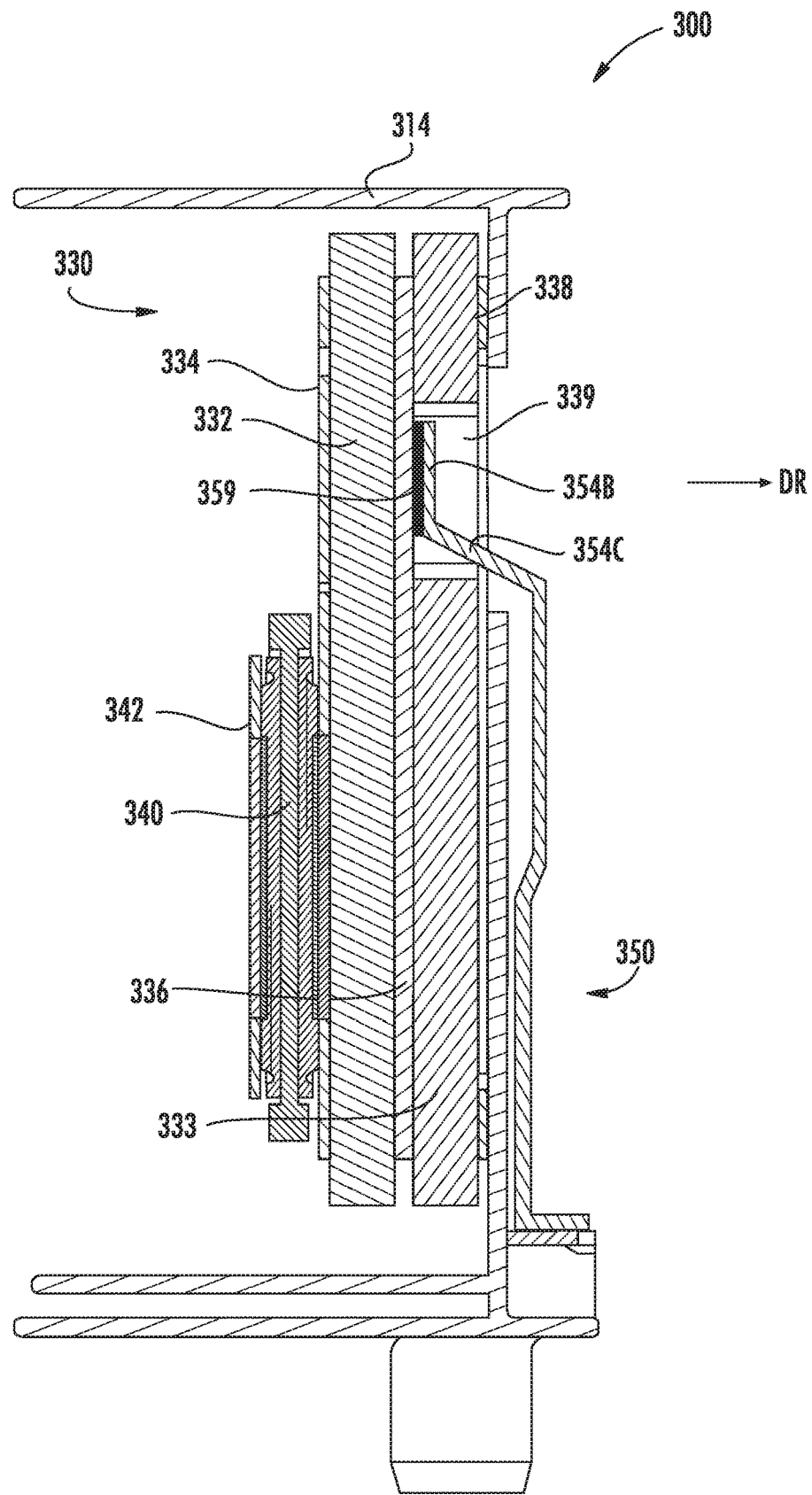
FIG. 19 is a cross-sectional view of the SPD module of FIG. 18 taken along the line 19-19 of FIG. 18.
Figure 20:
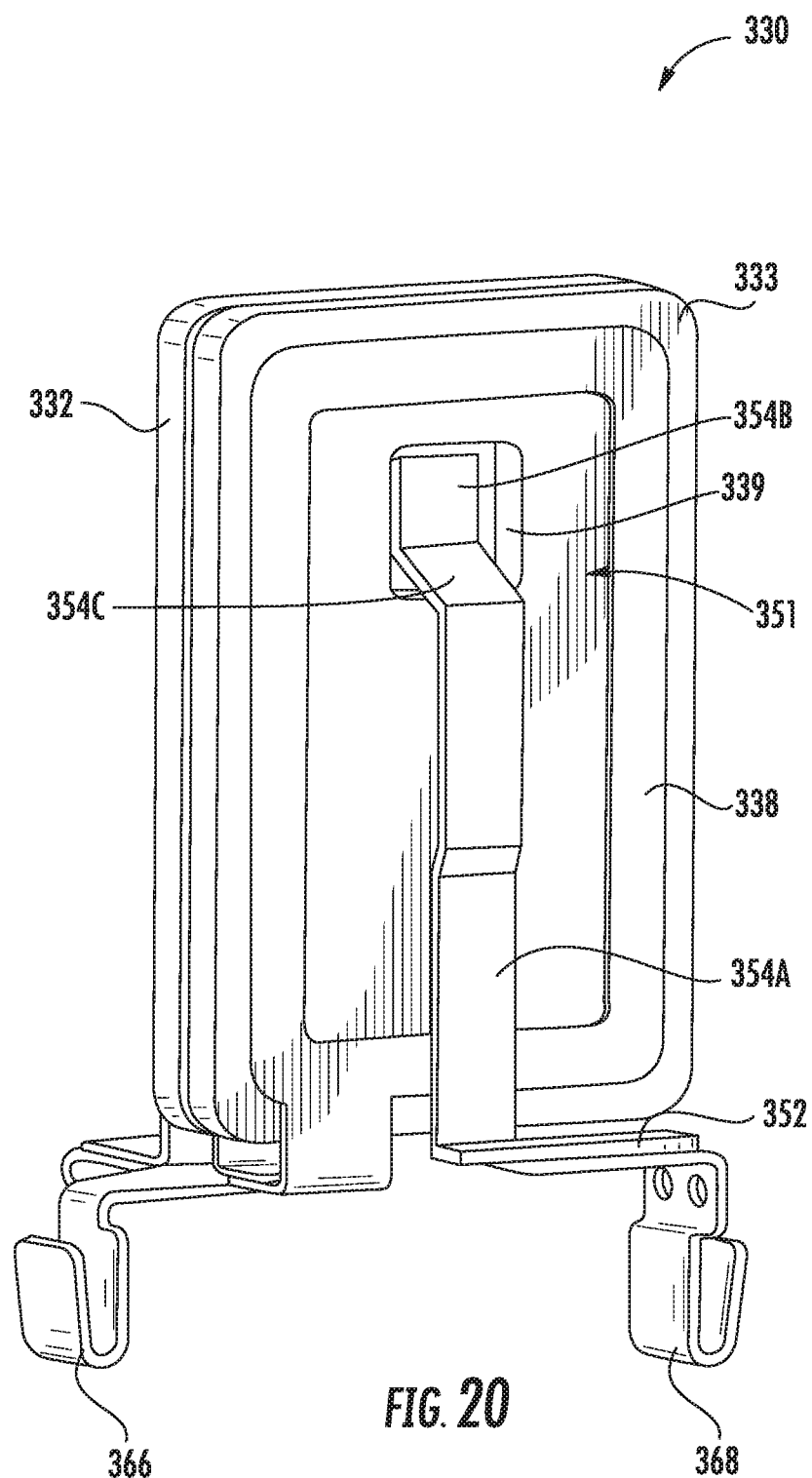
FIG. 20 is a perspective view of an overvoltage clamping element assembly forming a part of the SPD module of FIG. 18.
Figure 21:
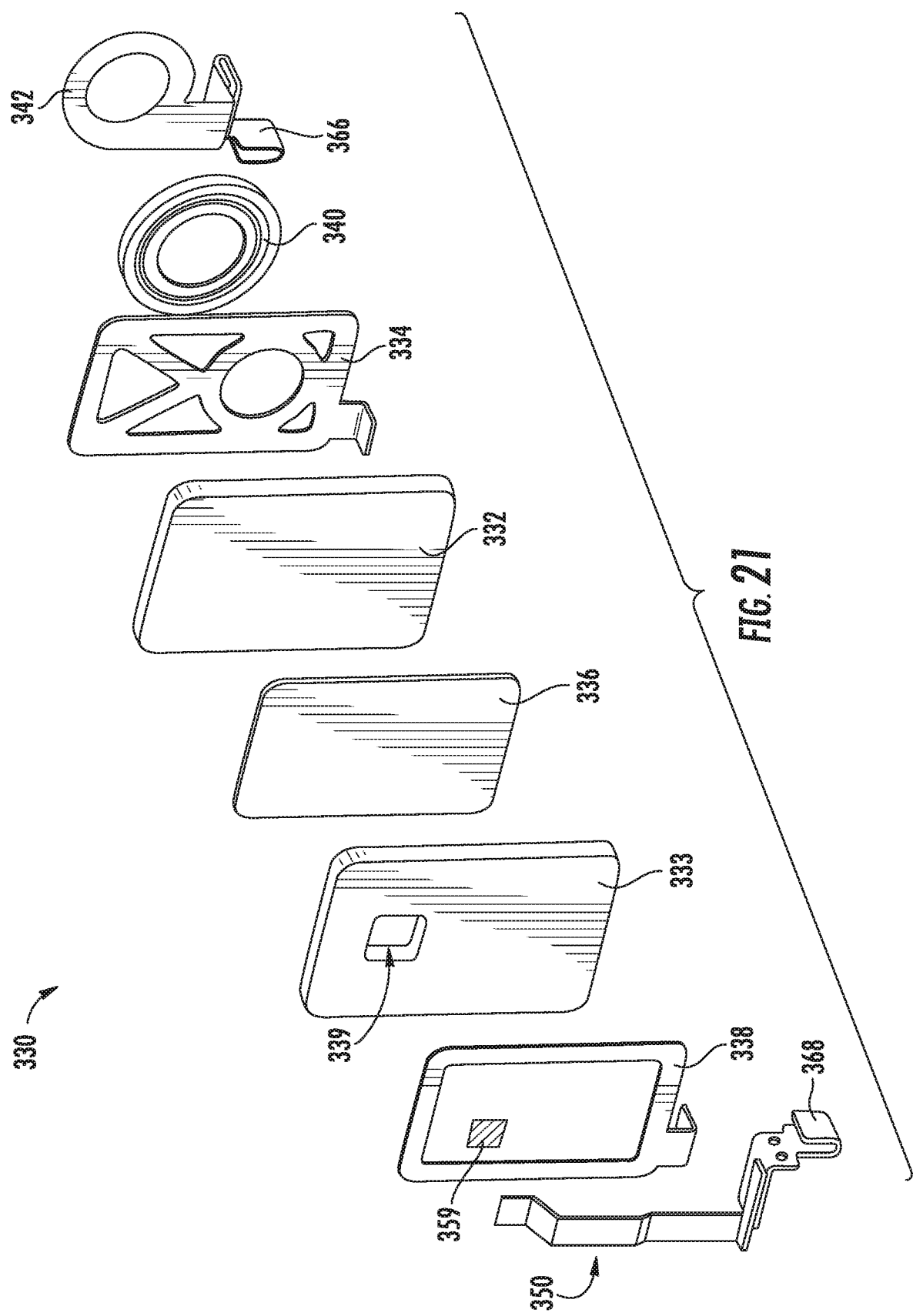
FIG. 21 is an exploded, perspective view of the overvoltage clamping element assembly of FIG. 20.

When the module 300 is assembled in the ready configuration as shown in FIGS. 18-20, the disconnect spring 350 is elastically bent, deformed or deflected so that it exerts a biasing load on the solder 359 pulling away from the varistor 333 and the electrode 336 in a release direction DR (FIG. 19).

In use, the thermal disconnector mechanism 351 operates to disconnect the assembly 330 from one of the module electrical terminals as described above for the thermal disconnector mechanism 151. More particularly, the solder 359 will melt or soften under the same conditions as described above for the solder 159 to release the contact portion 354B from the second electrode 336. Upon release, the contact portion 354B moves away from the second electrode to physically and electrically disconnect the disconnect spring 350 from the electrode 336, and thereby the varistors 332 and 333. A persistent spring load or bias is applied to the contact portion 354B to urge the contact portion 354B away from the second electrode 336 when the solder 359 releases the contact portion 354B. The disconnect spring 350 should move far enough away to achieve the appropriate creepage and air clearance between the electrode 336 and the disconnect spring 350. In some embodiments, the disconnect spring moves fully out of the hole 339. In other embodiments, a portion of the disconnect spring 350 may remain in the hole 339. The placement of the solder joint proximate the varistor 332 may provide more rapid thermal response and faster disconnection, and thereby good thermal stability.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A surge protective device (SPD) module comprising:
    a varistor including a hole defined therein and extending through the varistor;
    an electrode including:
        a contact portion electrically connected to a contact surface of the varistor; and
        an integral extension portion extending through the hole in the varistor;
    a module housing;
    first and second module electrical terminals mounted on the module housing, wherein the varistor is electrically connected between the first and second module electrical terminals; and
    a thermal disconnector mechanism positioned in a ready configuration, wherein the varistor is electrically connected with the second module electrical terminal, the thermal disconnector mechanism being repositionable to electrically disconnect the varistor from the second module electrical terminal, the thermal disconnector mechanism including:
        a disconnect spring elastically deflected and electrically connected to the extension portion of the electrode in the ready configuration; and
        a solder securing the disconnect spring in electrical connection with the extension portion of the electrode in the ready configuration, wherein:
            the solder is meltable in response to overheating in the SPD module; and
            the disconnect spring is configured to electrically disconnect the varistor from the second module electrical terminal when the solder is melted.

2. The SPD module of claim 1 wherein:
    the hole extends fully through a thickness of the varistor; and
    the electrode extends fully through the hole.

3. The SPD module of claim 2 wherein the hole has a depth of at least 1 mm.

4. The SPD module of claim 1 wherein the extension portion extends transversely to the contact portion.

5. The SPD module of claim 1 wherein the integral extension portion is a terminal tab and projects outwardly beyond a second surface of the varistor opposite the first contact surface.

6. The SPD module of claim 5 wherein the terminal tab projects outwardly beyond the second surface of the varistor a distance in the range of from about 0.1 mm to 15 mm.

7. The SPD module of claim 1 wherein the extension portion is a terminal tab and projects outwardly beyond a second surface of the varistor opposite the contact surface.

8. The SPD module of claim 1 including a weak region in the disconnect spring, wherein the disconnect spring is configured to break at the weak region in response to a current through the disconnect spring to electrically disconnect the varistor from the second module electrical terminal.

9. The SPD module of claim 1 including an indicator mechanism configured to provide an alert that the SPD module has failed when the thermal disconnector mechanism disconnects the overvoltage clamping element from the second module electrical terminal.

10. The SPD module of claim 9 wherein the indicator mechanism includes a local alert mechanism including:
    a window in the module housing;
    an indicator member movable between a ready position and an indicating position relative to the window; and
    an indicator spring configured to force the indicator member from the ready position to the indicating position when the thermal disconnector mechanism disconnects the varistor from the second module electrical terminal.

11. The SPD module of claim 9 wherein the indicator mechanism includes a remote alert mechanism including:
    a switch opening in the module housing to receive a switch pin from an external base assembly;
    a blocking member covering the switch opening; and
    an indicator spring configured to force the blocking member away from the switch opening when the thermal disconnector mechanism disconnects the varistor from the second module electrical terminal to permit the switch pin to extend through the switch opening.

12. A surge protective device (SPD) module comprising:
    a varistor including a hole defined therein and extending through the varistor;
    an electrode including:
        a contact portion electrically connected to a contact surface of the varistor; and
        an integral extension portion extending through the hole in the varistor;
    a module housing;
    first and second module electrical terminals mounted on the module housing; and
    a second electrode including a second contact portion connected to a second surface of the varistor opposite the first contact surface;
    wherein the extension portion of the first electrode electrically connects the first contact surface of the varistor to the second module electrical terminal; and
    wherein the second electrode electrically connects the second contact surface of the varistor to the first module electrical terminal.

13. The SPD module of claim 12 including a second varistor having a first contact surface facing the first varistor, wherein:
    the contact portion of the first electrode is interposed between the first varistor and the second varistor; and
    the second electrode electrically connects the first contact surface of the second varistor to the first module electrical terminal.

14. The SPD module of claim 13 including a gas discharge tube (GDT) electrically connected between the second electrode and the first module electrical terminal.

15. The SPD module of claim 14 including a third electrode electrically connected between the GDT and the first module electrical terminal.

16. A surge protective device (SPD) module comprising:
a varistor including a hole defined therein and extending through the varistor;
an electrode including:
  a contact portion electrically connected to a contact surface of the varistor; and
  an integral extension portion extending through the hole in the varistor; and
a second varistor having a first contact surface facing the first varistor, wherein:
  the contact portion of the electrode is interposed between the first varistor and the second varistor; and
  the contact portion of the electrode is electrically connected to the first contact surface of the second varistor.

17. A surge protective device (SPD) module comprising:
a varistor including a hole defined therein and extending through the varistor; and
an electrical conductor extending through the hole in the varistor;
wherein:
  the hole extends fully through a thickness of the varistor;
  the electrical conductor is an electrode including:
    a contact portion electrically connected to a first contact surface of the varistor; and
    an integral terminal tab that extends fully through the hole and projects outwardly beyond a second surface of the varistor opposite the first contact surface; and
  the SPD module further includes:
    a module housing;
    first and second module electrical terminals mounted on the module housing, wherein the varistor is electrically connected between the first and second module electrical terminals;
    a thermal disconnector mechanism positioned in a ready configuration, wherein the varistor is electrically connected with the second module electrical terminal, the thermal disconnector mechanism being repositionable to electrically disconnect the varistor from the second module electrical terminal, the thermal disconnector mechanism including:
      a disconnect spring elastically deflected and electrically connected to the extension portion of the electrode in the ready configuration;
      a solder securing the disconnect spring in electrical connection with the terminal tab of the electrode in the ready configuration, wherein:
        the solder is meltable in response to overheating in the SPD module; and
        the disconnect spring is configured to electrically disconnect the varistor from the second module electrical terminal when the solder is melted;
    a second electrode including a second contact portion connected to a second surface of the varistor opposite the first contact surface, wherein:
      the extension portion electrically connects the first contact surface to the second module electrical terminal; and
      the second electrode electrically connects the second contact surface to the first module electrical terminal;
    a second varistor having a first contact surface facing the first varistor, wherein:
      the contact portion of the first electrode is interposed between the first varistor and the second varistor; and
      the first electrode electrically connects the first contact surface of the second varistor to the second module electrical terminal;
    a gas discharge tube (GDT) electrically connected between the second electrode and the first module electrical terminal; and
    a third electrode electrically connected between the GDT and the first module electrical terminal.

18. A surge protective device (SPD) module comprising:
a varistor including a hole defined therein and extending through the varistor;
an electrical conductor extending through the hole in the varistor;
a module housing;
first and second module electrical terminals mounted on the module housing, wherein the varistor is electrically connected between the first and second module electrical terminals; and
a thermal disconnector mechanism positioned in a ready configuration, wherein the varistor is electrically connected with the second module electrical terminal, the thermal disconnector mechanism being repositionable to electrically disconnect the varistor from the second module electrical terminal, the thermal disconnector mechanism including:
  the electrical conductor extending through the hole in the varistor and electrically connected to the varistor in the ready configuration; and
  a solder securing the electrical conductor in electrical connection with the varistor in the ready configuration, wherein:
    the solder is meltable in response to overheating in the SPD module; and
    the thermal disconnector mechanism is configured to electrically disconnect the electrical conductor from the varistor and thereby disconnect the varistor from the second module electrical terminal when the solder is melted.

19. The SPD module of claim 12 wherein:
the hole in the varistor is defined by an interior sidewall of the varistor; and
an electrically insulating gap is defined between the interior sidewall and the extension portion and surrounds the extension portion, whereby the extension portion is electrically isolated from the second surface of the varistor and the interior sidewall except when current is conducted through the varistor.

20. The SPD module of claim 16 wherein:
the first varistor includes a second surface opposite the first contact surface of the first varistor;
the hole in the first varistor is defined by an interior sidewall of the first varistor; and
an electrically insulating gap is defined between the interior sidewall and the extension portion and surrounds the extension portion, whereby the extension portion is electrically isolated from the second surface of the first varistor and the interior sidewall except when current is conducted through the first varistor.

21. The SPD module of claim 17 wherein:
the hole in the varistor is defined by an interior sidewall of the varistor; and
an electrically insulating gap is defined between the interior sidewall and the terminal tab extending through the hole, whereby the terminal tab is electrically isolated from the second surface of the varistor and the interior sidewall except when current is conducted through the varistor.

22. The SPD module of claim 18 wherein:

the hole in the varistor is defined by an interior sidewall of the varistor;

the varistor has first and second opposed surfaces, and the hole extends from the first surface to the second surface; and an electrically insulating gap is defined between the interior sidewall and the electrical conductor and surrounds the electrical conductor, whereby the electrical conductor is electrically isolated from the second surface of the varistor and the interior sidewall except when current is conducted through the varistor.

* * * * *

UNITED STATES PATENT AND TRADEMARK OFFICE
CERTIFICATE OF CORRECTION

PATENT NO. : 10,685,767 B2
APPLICATION NO. : 15/704453
DATED : June 16, 2020
INVENTOR(S) : Kamenšek et al.

Page 1 of 1

It is certified that error appears in the above-identified patent and that said Letters Patent is hereby corrected as shown below:

In the Specification

Column 6, Line 54: Please correct "18211" to read -- 182H --

Column 6, Line 57: Please correct "18211" to read -- 182H --

Column 15, Line 5: Please correct "18211" to read -- 182H --

Signed and Sealed this
Thirteenth Day of October, 2020

Andrei Iancu
*Director of the United States Patent and Trademark Office*